US011711822B2

(12) United States Patent
Jin et al.

(10) Patent No.: US 11,711,822 B2
(45) Date of Patent: *Jul. 25, 2023

(54) METHOD AND APPARATUS FOR TRANSMITTING AND RECEIVING SIGNAL BY USING MULTIPLE BEAMS IN WIRELESS COMMUNICATION SYSTEM

(71) Applicant: Samsung Electronics Co., Ltd., Suwon-si (KR)

(72) Inventors: Seungri Jin, Suwon-si (KR); Hoondong Noh, Suwon-si (KR); Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,456

(22) Filed: Aug. 4, 2021

(65) Prior Publication Data

US 2021/0368486 A1 Nov. 25, 2021

Related U.S. Application Data

(63) Continuation of application No. 16/833,293, filed on Mar. 27, 2020, now Pat. No. 11,115,973.

(30) Foreign Application Priority Data

Mar. 28, 2019 (KR) .......................... 10-2019-0036223

(51) Int. Cl.
*H04W 72/044* (2023.01)
*H04W 72/23* (2023.01)

(52) U.S. Cl.
CPC ......... *H04W 72/23* (2023.01); *H04W 72/046* (2013.01)

(58) Field of Classification Search
CPC ............. H04W 72/042; H04W 72/046; H04W 72/0617; H04W 7/0617; H04W 7/063; H04W 7/0634
(Continued)

(56) References Cited

U.S. PATENT DOCUMENTS

| 2018/0227035 A1 | 8/2018 | Cheng et al. |
| 2018/0227793 A1 | 8/2018 | Kim et al. |

(Continued)

FOREIGN PATENT DOCUMENTS

KR    10-2018-0091548 A    8/2018

OTHER PUBLICATIONS

European Patent Office, "Supplementary European Search Report" dated Mar. 16, 2022, in connection with European Patent Application No. 20779320.9, 10 pages.
(Continued)

*Primary Examiner* — Ted M Wang

(57) ABSTRACT

A method performed by a user equipment (UE) in a wireless communication system includes receiving, from a base station (BS), physical downlink shared channel (PDSCH) configuration information including a list of transmission configuration indicator (TCI) states, receiving, from the BS, a PDSCH media access control element (MAC CE) including information indicating activation of at least one TCI state in the list, identifying whether the PDSCH MAC CE is a MAC CE capable of indicating two or more TCI states for one TCI codepoint, receiving, from the BS, downlink control information (DCI) including information indicating a TCI codepoint, and receiving, from the BS, data via a PDSCH based on the information indicating activation of the at least one TCI state, a result of the identifying, and the information indicating the TCI codepoint.

16 Claims, 17 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2019/0239212 A1* | 8/2019 | Wang | H04W 72/0413 |
| 2019/0342907 A1* | 11/2019 | Huang | H04W 72/23 |
| 2020/0106645 A1 | 4/2020 | Tsai et al. | |
| 2020/0196383 A1 | 6/2020 | Tsai et al. | |

OTHER PUBLICATIONS

3GPP TS 38.321 V15.4.0 (Dec. 2018); Technical Specification; 3rd Generation Partnership Project; Technical Specification Group Radio Access Network; NR; Medium Access Control (MAC) protocol specification (Release 15); 77 pages.

International Search Report and Written Opinion of the International Searching Authority in connection with International Application No. PCT/KR2020/004171 dated Jul. 2, 2020, 10 pages.

Ericsson, "On MAC-CE signaling impact of Rel-16 TCI indication framework," R1-1902861, 3GPP TSG RAN WG1 Meeting #96, Athens, Greece, Feb. 25-Mar. 1, 2019, 3 pages.

Huawei, et al., "Single PDCCH based multi-TRP/panel transmission," R1-1903099, 3GPP TSG RAN WG1 Meeting #96, Athens, Greece, Feb. 25-Mar. 1, 2019, 7 pages.

MediaTek Inc., "TP for MAC CEs to Support Beam Management and CSI Acquisition," R2-1802404, 3GPP TSG-RAN2#101, Athens, Greece, Feb. 26-Mar. 2, 2018, 5 pages.

ZTE, "Enhancements on multi-TRP/Panel transmission," R1-1900087, 3GPP TSG RAN WG1 Ad-Hoc Meeting 1901, Taipei, Jan. 21-25, 2019, 16 pages.

* cited by examiner

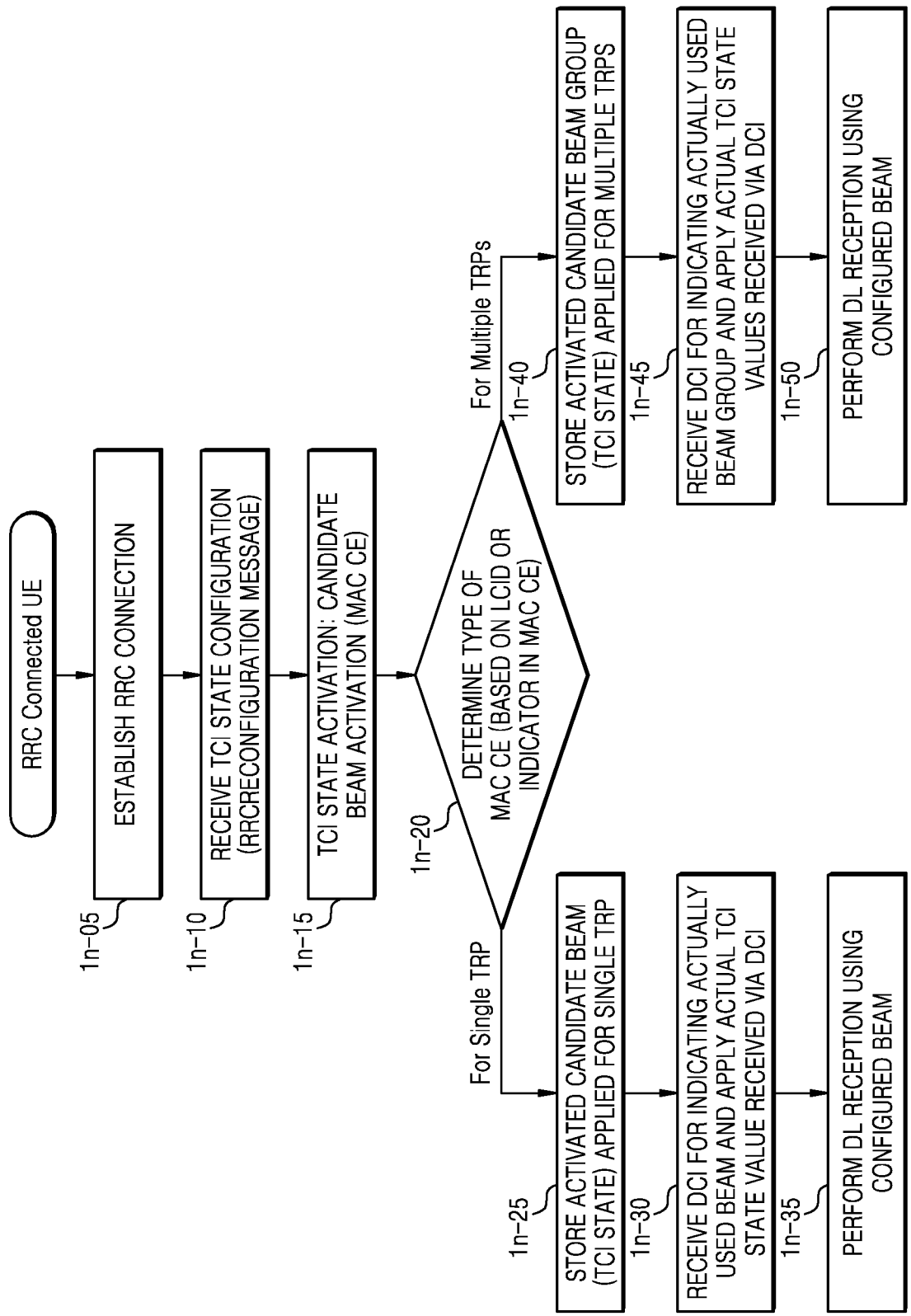

METHOD AND APPARATUS FOR TRANSMITTING AND RECEIVING SIGNAL BY USING MULTIPLE BEAMS IN WIRELESS COMMUNICATION SYSTEM

CROSS-REFERENCE TO RELATED APPLICATIONS

This application is a continuation of application Ser. No. 16/833,293, filed Mar. 27, 2020, which is based on and claims priority under 35 U.S.C. § 119 to Korean Patent Application No. 10-2019-0036223, filed on Mar. 28, 2019, in the Korean Intellectual Property Office, the disclosures of which are incorporated by references herein in their entirety.

BACKGROUND

1. Field

The disclosure relates to a method and apparatus for transmitting and receiving a signal by using multiple beams in a wireless communication system.

2. Description of Related Art

An improved $5^{th}$ generation (5G) communication system or pre-5G communication system is being developed to keep up with explosively growing wireless data traffic demand due to the commercialization of $4^{th}$ generation (4G) communication systems and the increase in multimedia services. For this reason, the 5G or pre-5G communication system is called a beyond 4G network communication system or a post long-term evolution (LTE) system.

Implementation of 5G communication systems in an ultra-high frequency (millimeter wave (mmW)) band (such as a 60-GHz band) is under consideration to increase data transfer rates. To mitigate path loss and increase transmission distance during radio wave propagation in an ultra-high frequency band for 5G communication systems, various technologies such as beamforming, massive multiple-input multiple-output (MIMO), full dimensional MIMO (FD-MIMO), array antennas, analog beamforming, and large-scale antennas are being studied.

Furthermore, to improve system networks for 5G communication systems, various technologies including evolved small cells, advanced small cells, cloud radio access network (cloud-RAN), ultra-dense networks, device to device (D2D) communication, wireless backhaul, moving networks, cooperative communication, coordinated multi-points (CoMP), and interference cancellation are currently being developed. Furthermore, for 5G systems, advanced coding modulation (ACM) schemes such as Hybrid FSK and QAM modulation (FQAM) and SWSC (sliding window superposition coding) and advanced access techniques such as filter bank multi-carrier (FBMC), non-orthogonal multiple access (NOMA), sparse code multiple access (SDMA), etc. are being developed.

Moreover, the Internet has evolved from a human-centered connection network, in which humans create and consume information, to the internet of things (IoT) network in which dispersed components such as objects exchange information with one another to process the information. The internet of everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT can be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies, such as sensor networks, M2M communication, MTC, etc., are implemented using techniques for 5G communication, including beamforming, MIMO, and array antennas. The application of the above-described cloud RAN as a big data processing technology is an example of convergence between the 5G and IoT technologies.

As various services may be provided due to the aforementioned technical features and the development of wireless communication systems, in particular, a method is required which is capable of smoothly supporting communications by using a plurality of beams.

SUMMARY

Provided are a method and apparatus capable of effectively providing a service in a mobile communication system. Also, provided are a method and apparatus for transmitting and receiving signals by using a plurality of beams.

Additional aspects will be set forth in part in the description which follows and, in part, will be apparent from the description, or may be learned by practice of the presented embodiments of the disclosure.

According to an embodiment of the disclosure, a method performed by a user equipment (UE) in a wireless communication system includes receiving, from a base station (BS), physical downlink shared channel (PDSCH) configuration information including a list of transmission configuration indicator (TCI) states, receiving, from the BS, a PDSCH media access control control element (MAC CE) including information indicating activation of at least one TCI state in the list, identifying whether the PDSCH MAC CE is a MAC CE capable of indicating two or more TCI states for one TCI codepoint, receiving, from the BS, downlink control information (DCI) including information indicating a TCI codepoint, and receiving, from the BS, data via a PDSCH based on the information indicating activation of the at least one TCI state, a result of the identifying, and the information indicating the TCI codepoint.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1N illustrates a flow chart of a UE operation according to an embodiment of the disclosure;

FIG. 1O illustrates a flow chart of a BS according to an embodiment of the disclosure;

DETAILED DESCRIPTION

Figure 1A:
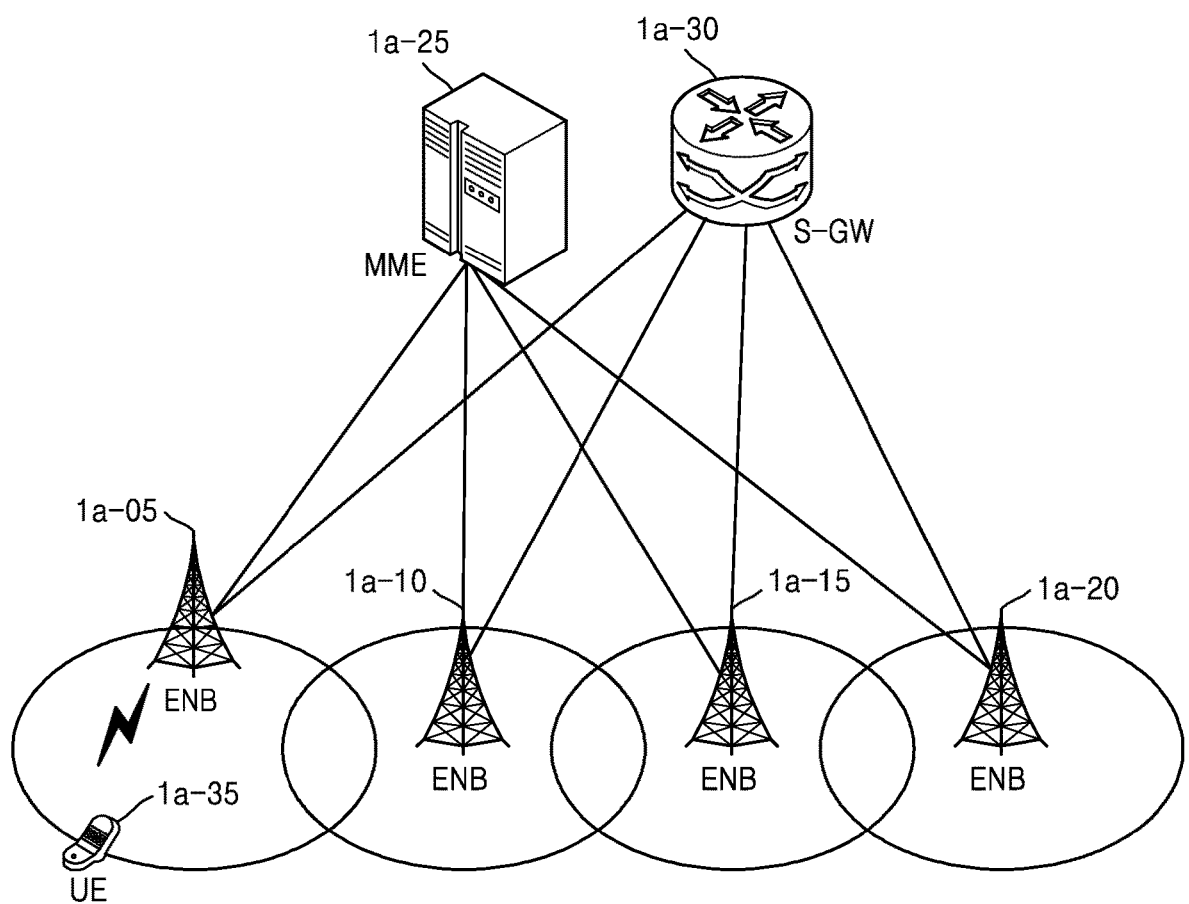
FIG. 1A illustrates a structure of a long term evolution (LTE) system according to an embodiment of the disclosure.
Figure 1B:
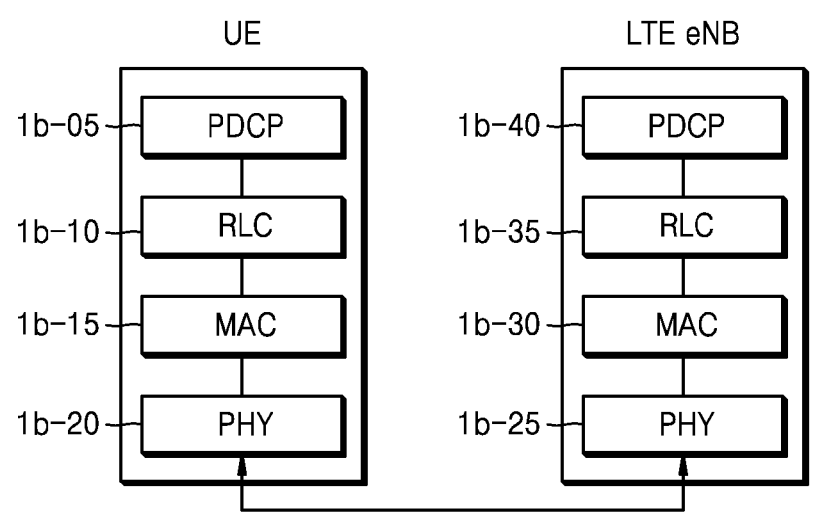
FIG. 1B illustrates a radio protocol architecture for an LTE system, according to an embodiment of the disclosure.
Figure 1C:
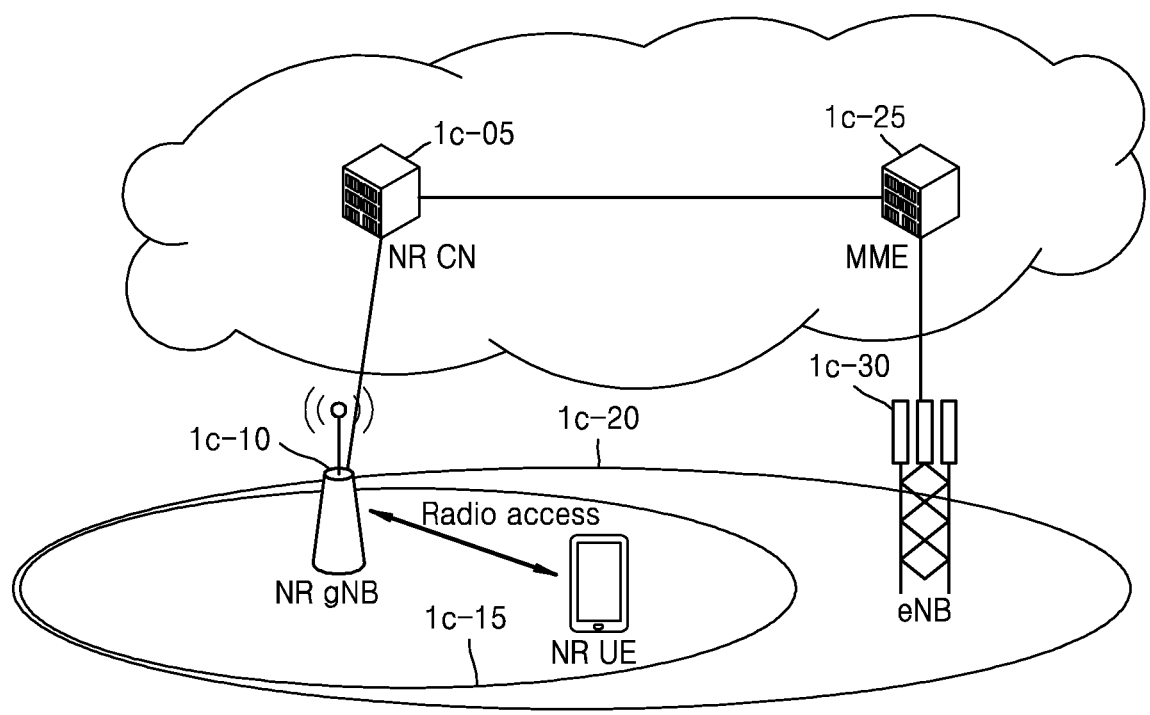
FIG. 1C illustrates a structure of a next-generation mobile communication system according to an embodiment of the disclosure.
Figure 1D:
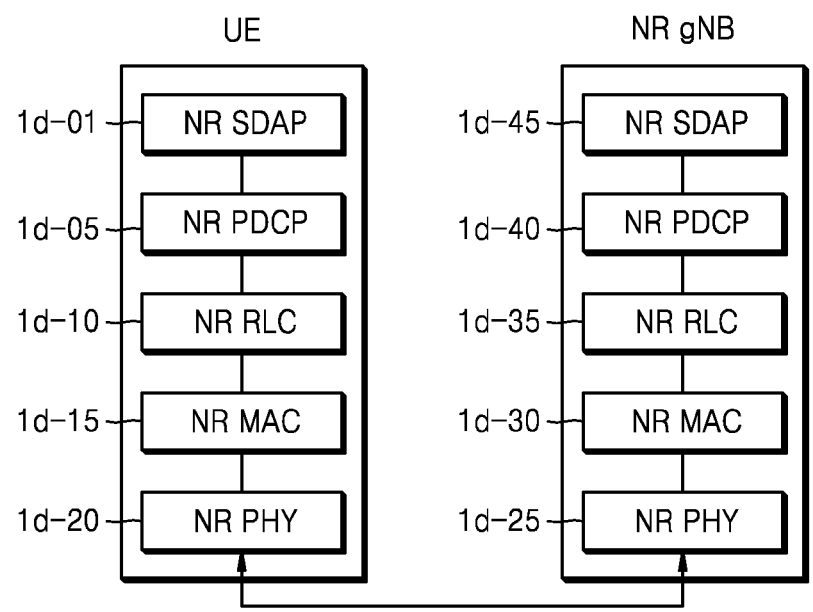
FIG. 1D illustrates a radio protocol architecture for a next-generation mobile communication system, according to an embodiment of the disclosure.
Figure 1E:
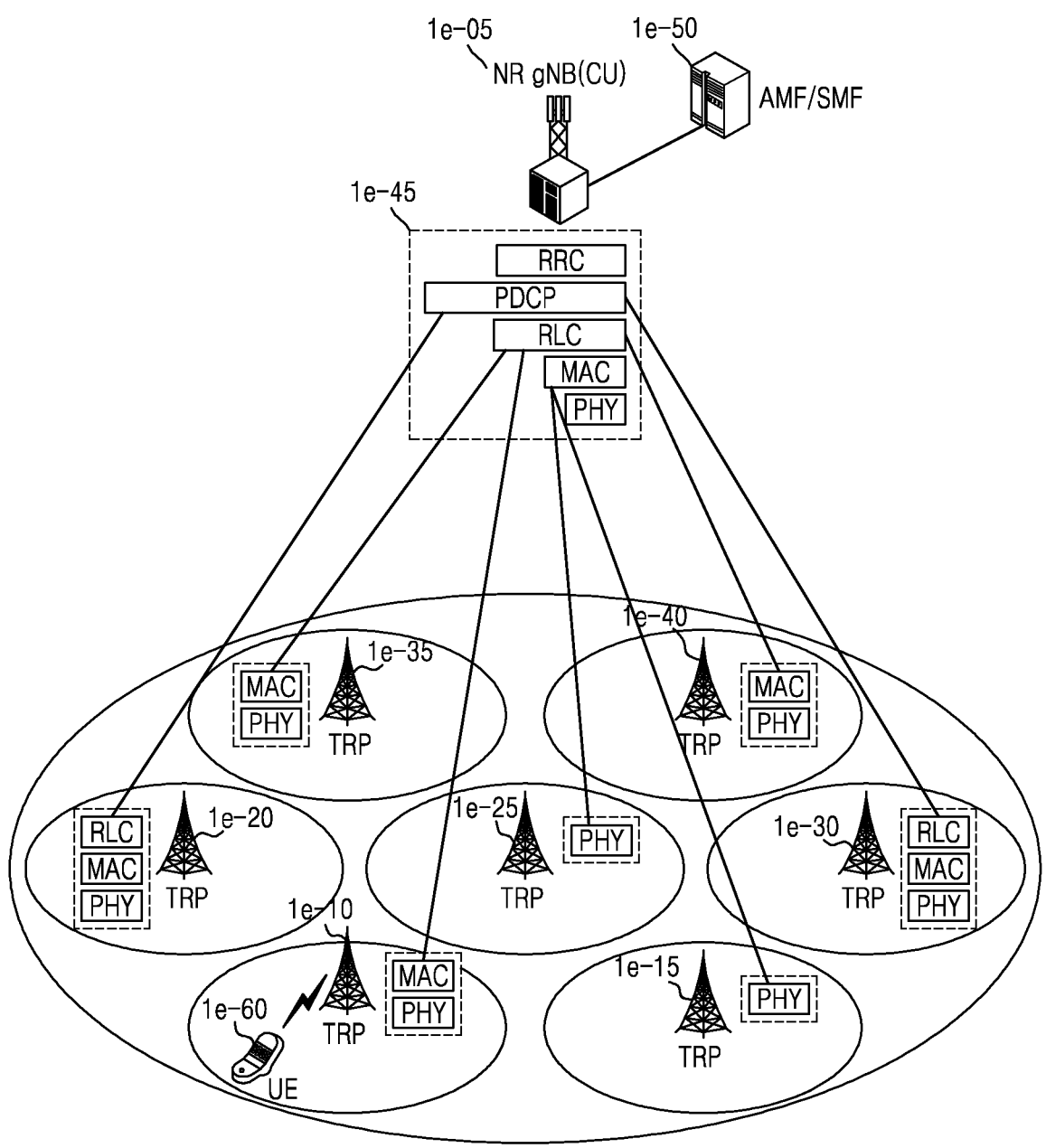
FIG. 1E illustrates a structure of a next-generation mobile communication system according to an embodiment of the disclosure.
Figure 1F:
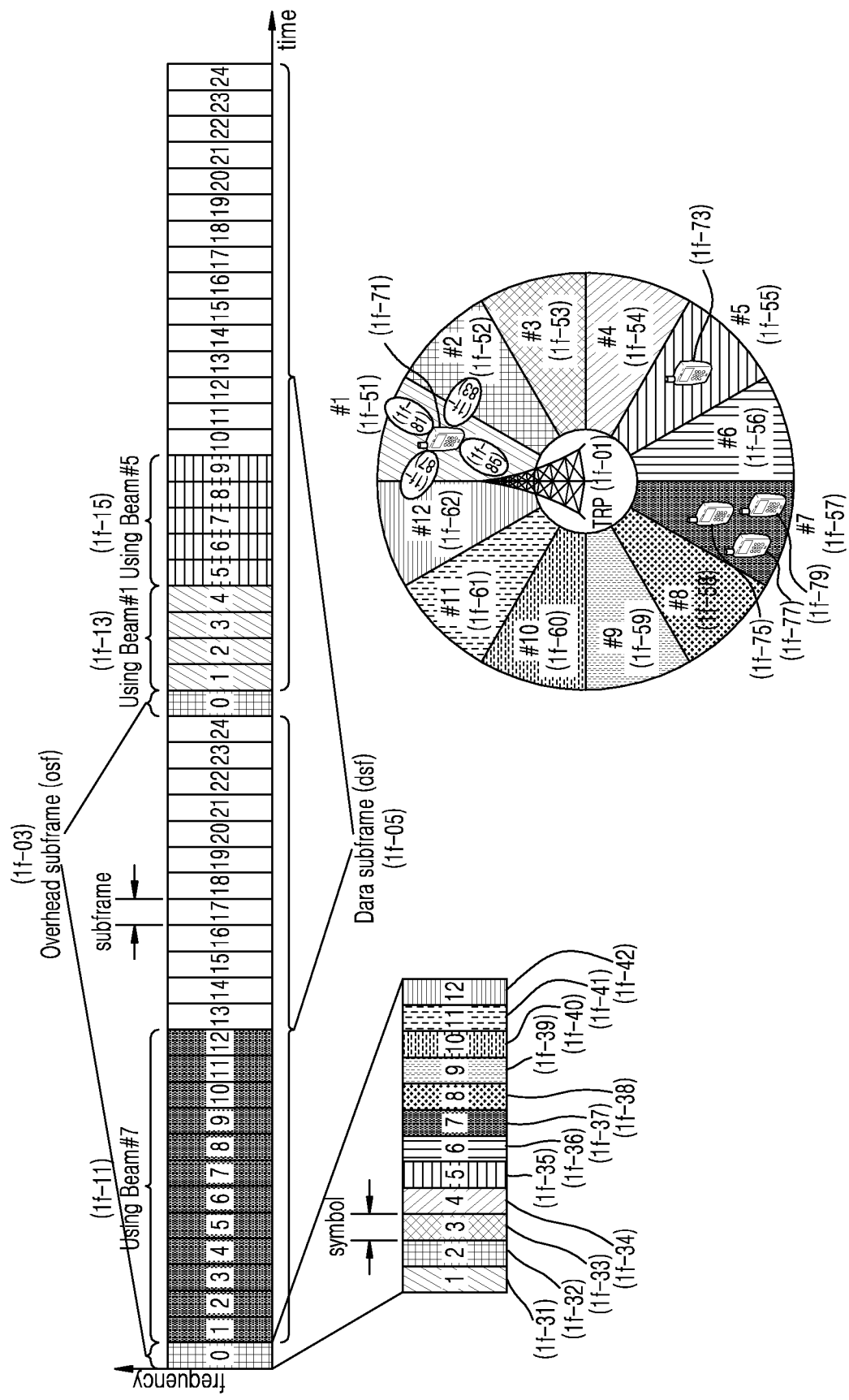
FIG. 1F illustrates a frame structure used in a new radio (NR) system, according to an embodiment of the disclosure.
Figure 1G:
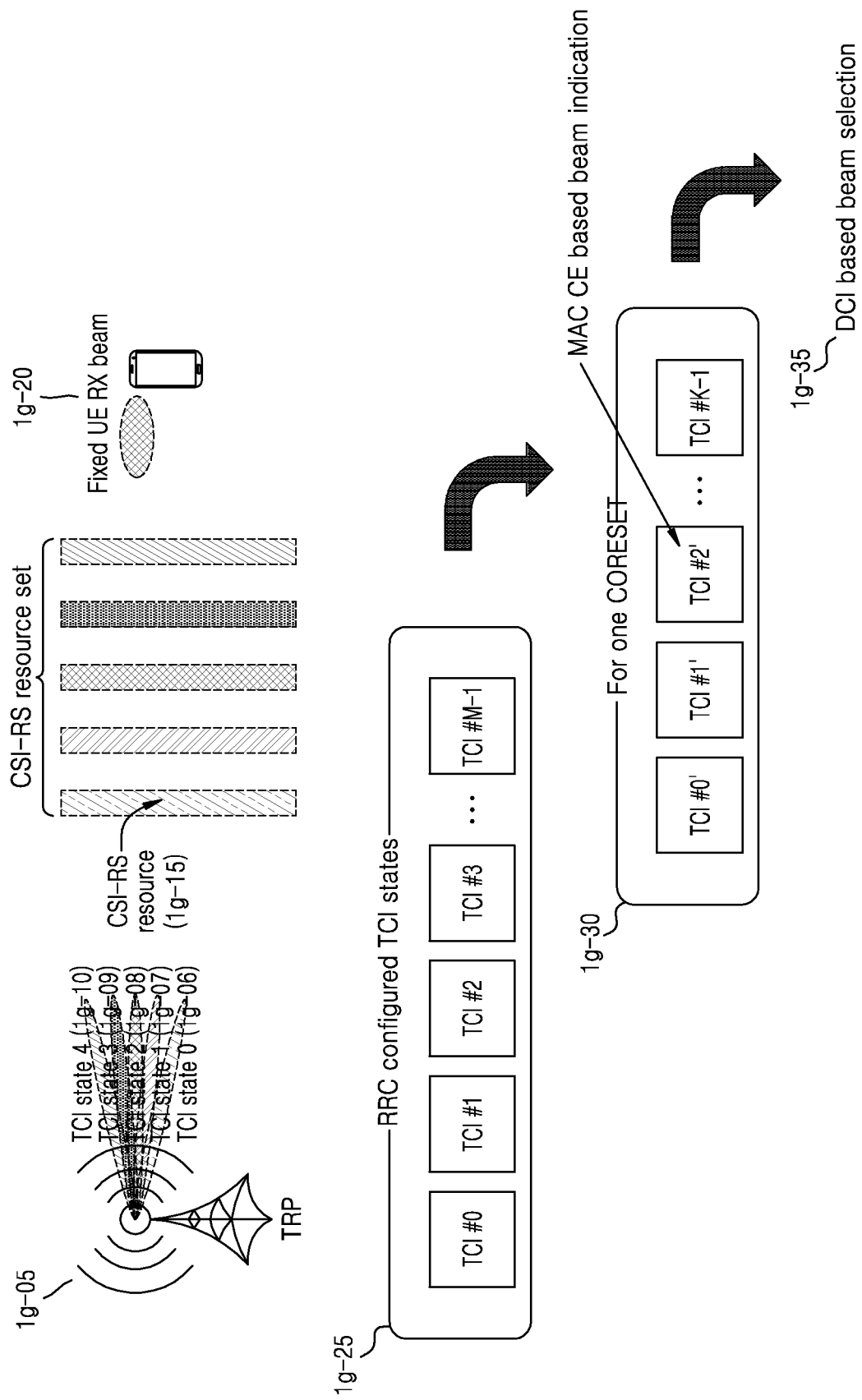
FIG. 1G illustrates an entire process of indicating, by a base station (BS) in an NR system, a beam for a downlink signal transmitted via a physical downlink shared channel (PDSCH), according to an embodiment of the disclosure.
Figure 1H:
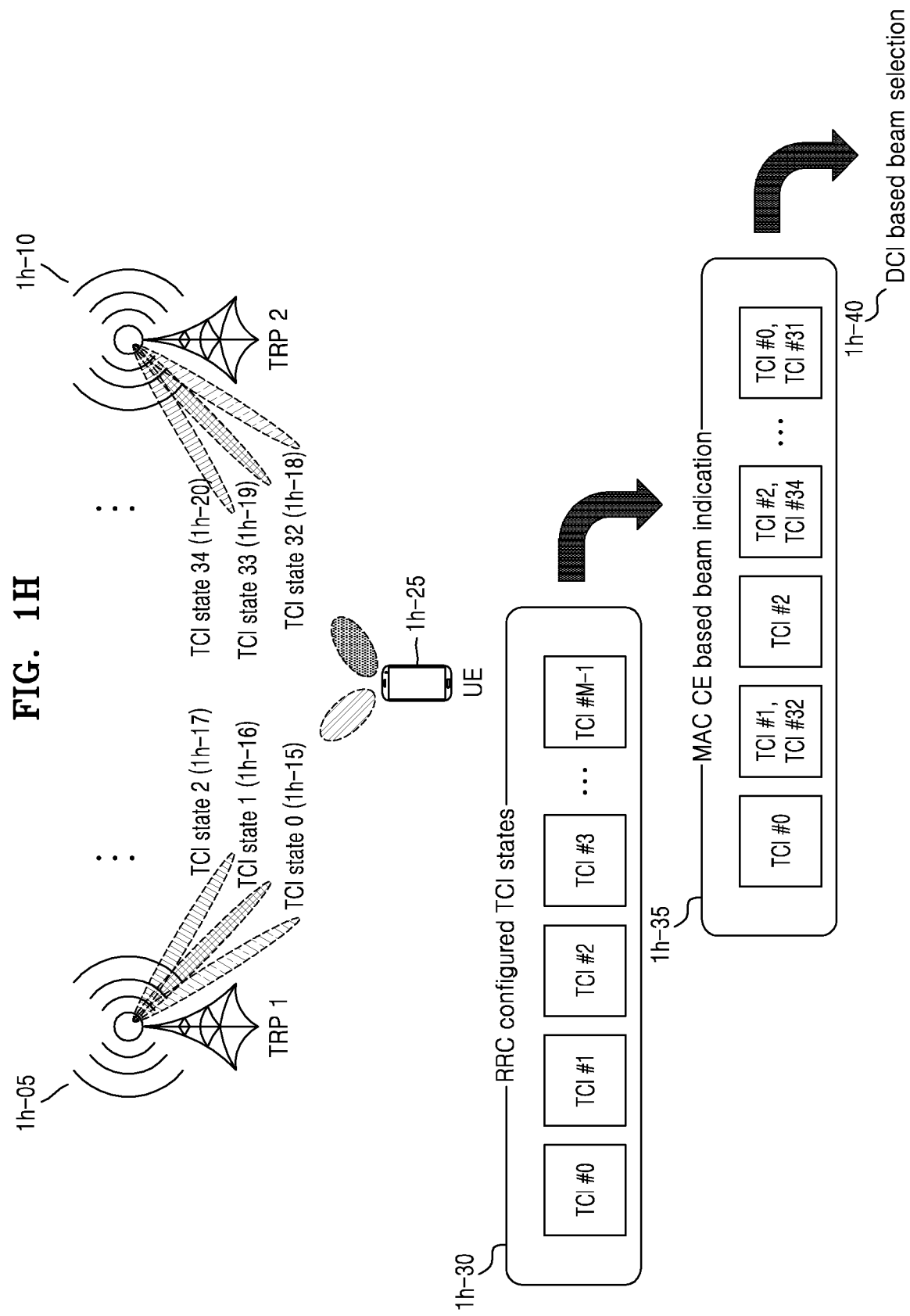
FIG. 1H illustrates an entire process of indicating, by a BS in an NR system, a beam group for downlink signals transmitted in a PDSCH via a plurality of transmission reception points (TRPs), according to an embodiment of the disclosure.
Figure 1I:
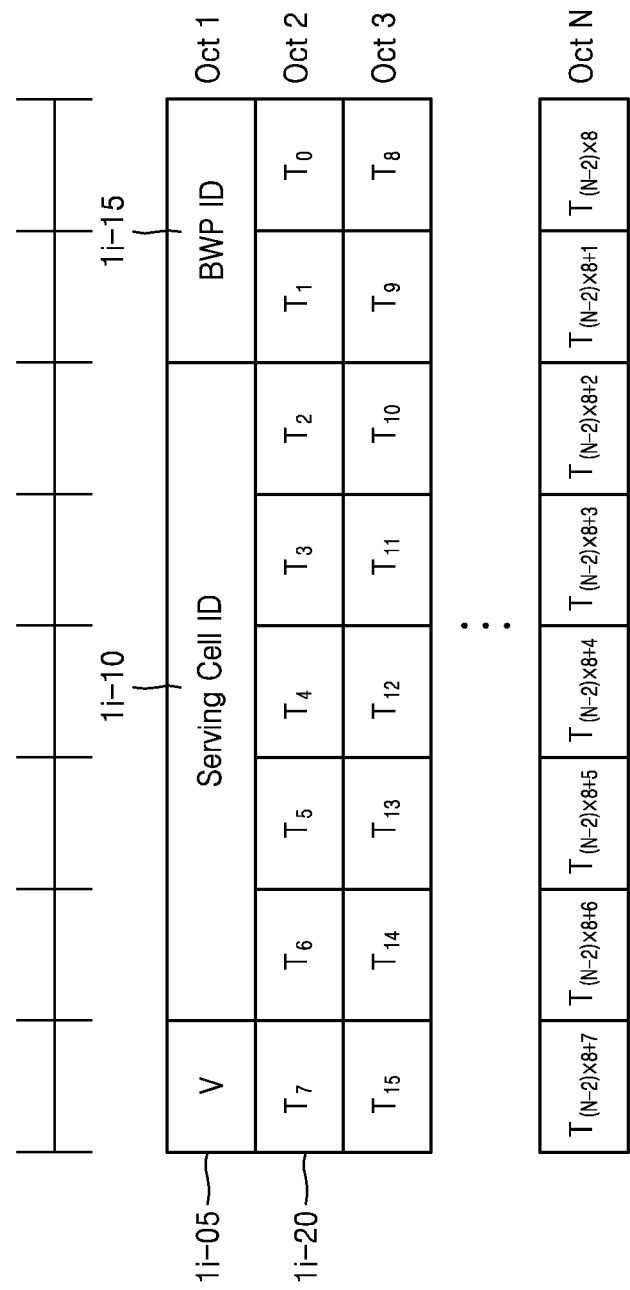
FIG. 1I illustrates a medium access control-control element (MAC CE) structure and a method of activating a candidate downlink beam group transmitted from multiple TRPs, according to an embodiment of the disclosure.
Figure 1J:
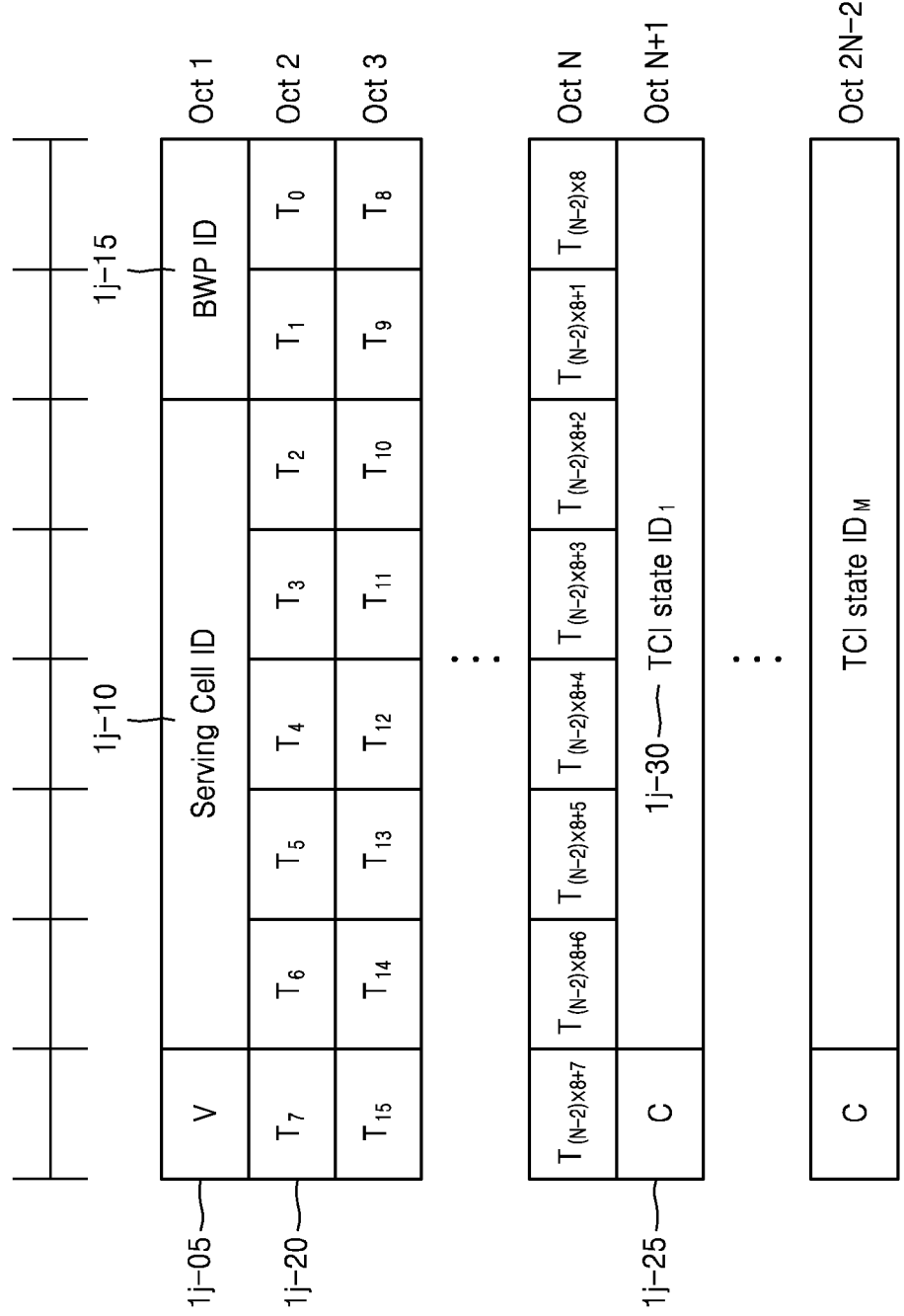
FIG. 1J illustrates a MAC CE structure and a method of activating a candidate downlink beam group transmitted from multiple TRPs, according to an embodiment of the disclosure.
Figure 1K:
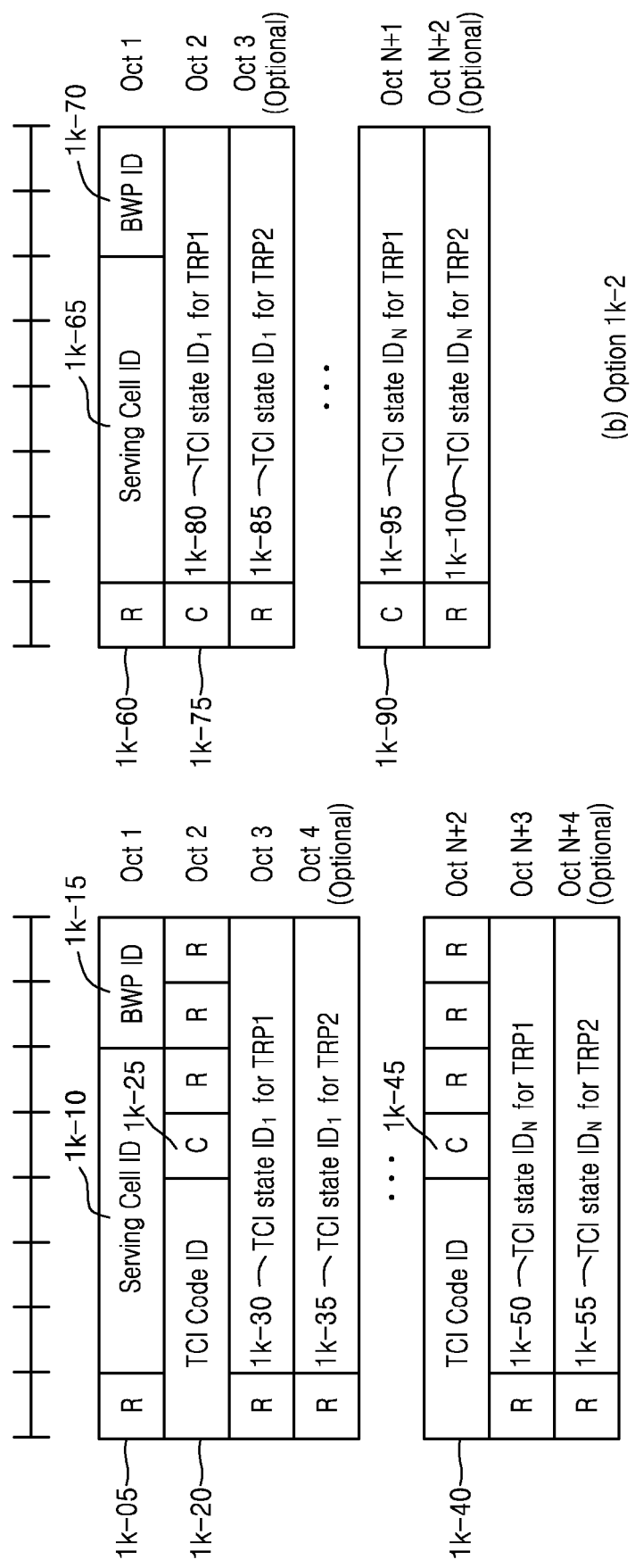
FIG. 1K illustrates a MAC CE structure and a method of activating a candidate downlink beam group transmitted from multiple TRPs, according to an embodiment of the disclosure.
Figure 1L:
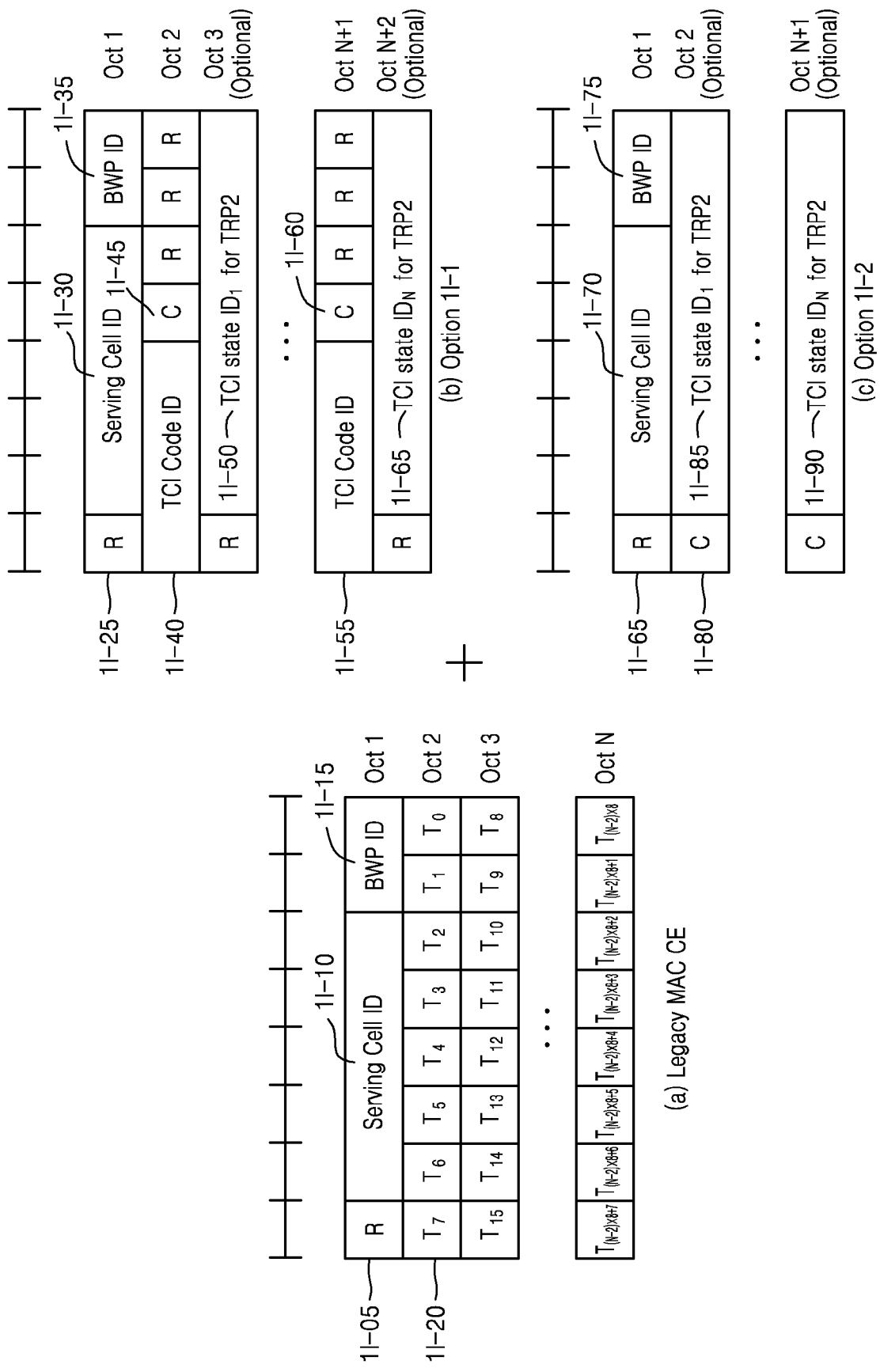
FIG. 1L illustrates a MAC CE structure and a method of activating a candidate downlink beam group transmitted from multiple TRPs, according to an embodiment of the disclosure.
Figure 1M:
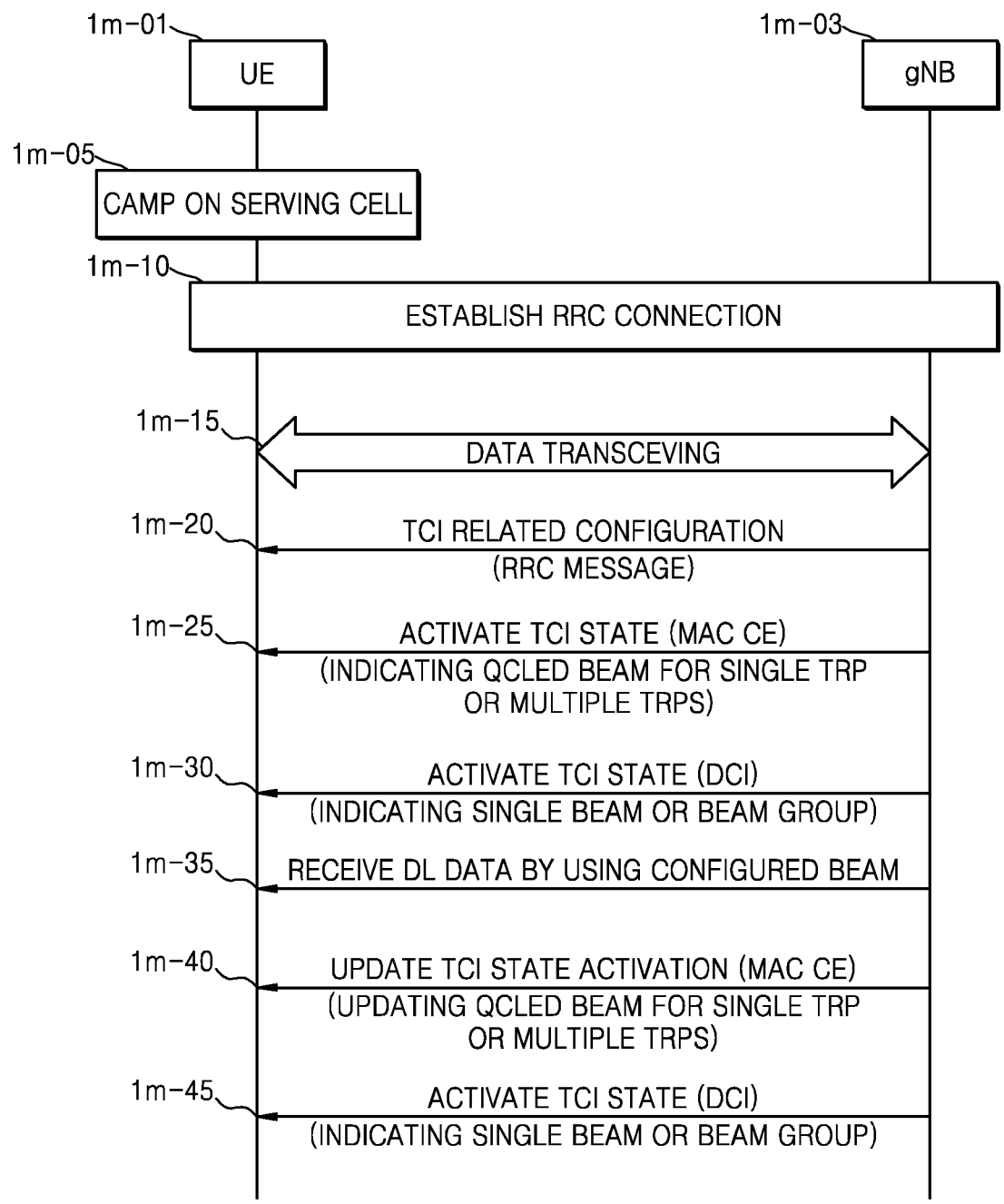
FIG. 1M illustrates a method, performed by a BS, of configuring a downlink beam group via multiple TRPs and communicating with a user equipment (UE), according to an embodiment of the disclosure.
Figure 10:
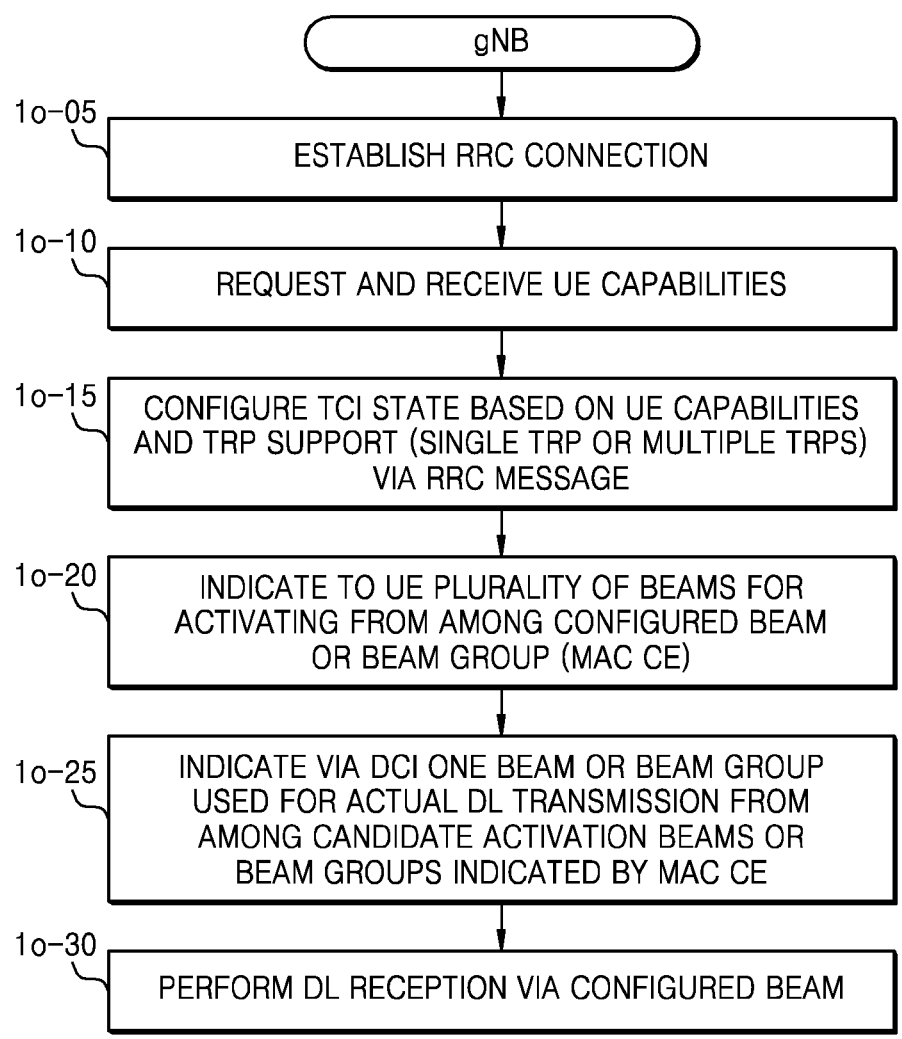
Figure 1P:
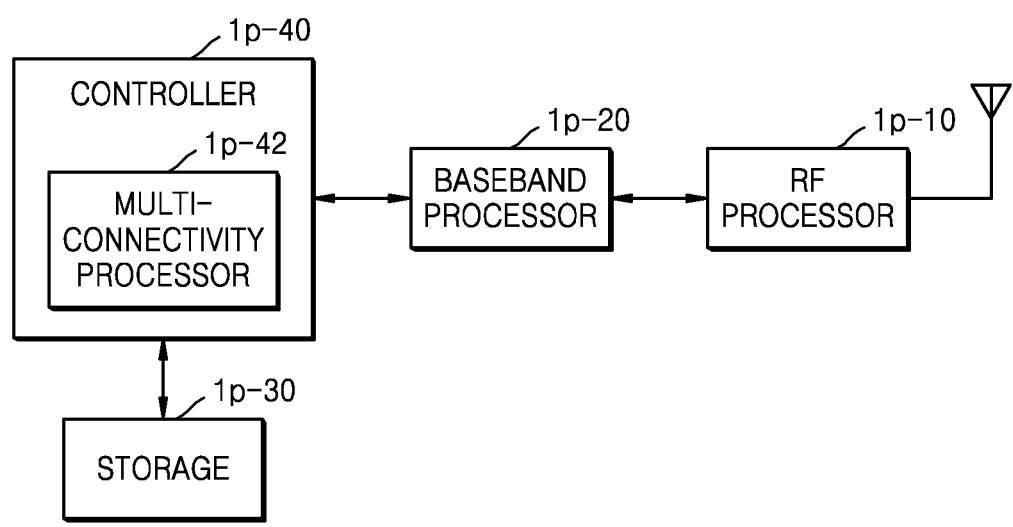
FIG. 1P illustrates an internal structure of a UE according to an embodiment of the disclosure.
Figure 1Q:
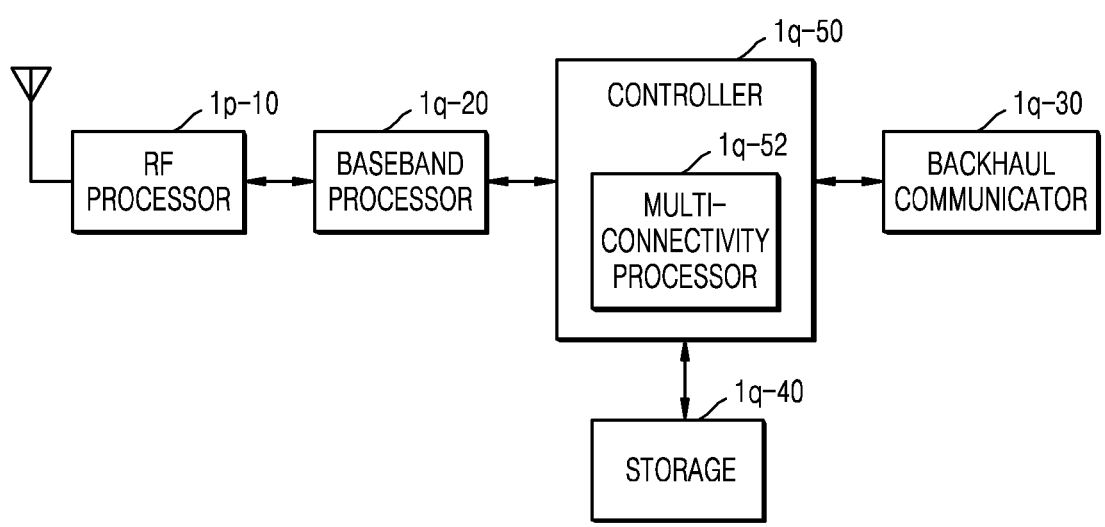
FIG. 1Q illustrates a configuration of a BS according to an embodiment of the disclosure.

FIGS. 1A through 1Q, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smartphone, a computer, or a multimedia system capable of performing a communication function.

In the disclosure, a controller may also be referred to as a processor.

Throughout the specification, a layer (or a layer apparatus) may also be referred to as an entity.

Hereinafter, operation principles of the disclosure will be described in detail with reference to the accompanying drawings. In the following description of the disclosure, known functions or configurations are not described in detail because they would obscure the essence of the disclosure with unnecessary detail. Furthermore, the terms used herein are defined by taking functions described in the disclosure into account and may be changed according to a user's or operator's intent, or practices. Therefore, definition of the terms should be made based on the overall description of the disclosure.

As used in the following description, terms identifying access nodes, terms indicating network entities, terms indicating messages, terms indicating interfaces between network entities, terms indicating various types of identification information, etc. are exemplified for convenience of description. Accordingly, the disclosure is not limited to terms to be described later, and other terms representing objects having the equivalent technical meaning may be used.

Hereinafter, a base station (BS) is an entity that allocates resources to a UE, and may be at least one of a gNode B, an eNode B, a Node B, a BS, a wireless access unit, a BS controller, or a network node. The term terminal may refer to a mobile phone, narrowband Internet of things (NB-IoT) devices, and sensors as well as other wireless communication devices. However, the BS and the terminal are not limited to the above examples.

Hereinafter, for convenience of description, the disclosure uses terms and names defined in the 3rd generation partnership project long term evolution (3GPP LTE) and/or 3GPP new radio (3GPP NR) specifications. However, the disclosure is not limited to the terms and names but may also be identically applied to systems that comply with other standards.

Because a post LTE communication system, i.e., a $5^{th}$ generation (5G) communication system, needs to be able to freely reflect various requirements from users and service providers, the 5G communication system is required to support services that simultaneously satisfy the various requirements. Services being considered for 5G communication systems include enhanced mobile broadband (eMBB), massive machine type communication (mMTC), ultra-reliable low-latency communication (URLLC), etc.

According to an embodiment of the disclosure, eMBB may aim to provide higher data transfer rates than those supported by the existing LTE, LTE-advanced (LTE-A), or LTE-Pro. For example, in 5G communication systems, eMBB may be able to deliver peak data rates of 20 gigabits per second (Gbps) in downlink and 10 Gbps in uplink from a base station (BS) perspective. Furthermore, the 5G communication systems may be able to provide better user perceived data rates while simultaneously delivering the peak data rates. To meet such requirements, the 5G communication systems may require improvement of various transmission/reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the Internet of Thing (IoT) in 5G communication systems. In order to efficiently provide the IoT, the mMTC may require support of massive connection with terminals in a cell, enhanced terminal coverage, improved battery life, low terminal cost, etc. Because IoT is a system equipped with multiple sensors and various devices to provide communication functions, the IoT may be able to support a large number of terminals (e.g., one million terminals per square kilometer ($km^2$) in the cell. Furthermore, because a terminal supporting the mMTC is highly likely to be located in a shaded area that cannot be covered by a cell, such as a basement of a building, due to characteristics of the service, the mMTC may require wide area coverage compared to other services provided by a 5G communication system. The terminal supporting the mMTC may be configured as a low-cost terminal and require a very long battery life-time (e.g., 10 to 15 years) because it is difficult to frequently replaced a battery of the terminal.

Lastly, URLLC is a cellular-based wireless communication service used for mission-critical applications such as remote control of robots or machinery, industrial automation, unmanned aerial vehicles (UAVs), remote health care, emergency alert services, etc. Thus, URLLC communications may be able to provide very low latency (ultra-low latency) and extremely high reliability (ultra-high reliability). For example, services supported by URLLC may have to satisfy air interface latency of less than 0.5 milliseconds (ms) and simultaneously have requirements of packet error rate of less than $10^{-5}$. Thus, to support the URLLC services, a 5G system has to provide a transmission time interval (TTI) shorter than for other services and may simultaneously require a design for allocating wide frequency-band resources to ensure high reliability of a communication link.

The above-described three services considered in the 5G communication systems, i.e., eMBB, URLLC, and mMTC may be multiplexed in one system for transmission. Different transmission/reception techniques and transmission/reception parameters may be used between services to satisfy different requirements for the respective services. However, the mMTC, URLLC, and eMBB are merely examples of different service types, and service types to which the disclosure is applied are not limited to the above-described examples.

Although embodiments of the disclosure are hereinafter described as an example of an LTE or LTE-LTE-A system, the embodiments of the disclosure may be applied to other communication systems having similar technical backgrounds and channel configurations. Furthermore, it should be understood by those skilled in the art that embodiments of the disclosure are applicable to other communication systems through modifications not departing from the scope of the disclosure.

Hereinafter, embodiments of the disclosure will be described in more detail with reference to the accompanying drawings.

FIG. 1A illustrates a structure of an LTE system according to an embodiment of the disclosure.

Referring to FIG. 1A, a radio access network for the LTE system consists of Evolved Node Bs (hereinafter referred to as eNBs, Node Bs, or BSs) 1a-05, 1a-10, 1a-15, and 1a-20, a mobility management entity (MME) 1a-25, and a serving-gateway (S-GW) 1a-30. A user equipment (hereinafter, referred to as a "UE" or terminal) 1a-35 connects to an external network via the eNBs 1a-05 through 1a-20 and the S-GW 1a-30.

In FIG. 1A, the eNBs 1a-05 through 1a-20 correspond to existing node Bs in a universal mobile telecommunication system (UMTS). The eNBs 1a-05 through 1a-20 are each connected to the UE 1a-35 via radio channels and perform more complicated functions than the existing Node B. In the LTE system, as all user traffic including real-time services like voice over internet protocol (VoIP) services is served on shared channels, an entity may be needed to perform scheduling by collecting status information such as buffer states, available transmit power states, and channel states for UEs. Each of the eNBs 1a-05 through 1a-20 may perform the scheduling function. One eNB typically controls a plurality of cells. For example, to achieve a data rate of 100 megabits per second (Mbps), the LTE system may utilize orthogonal frequency division multiplexing (hereinafter abbreviated as OFDM) in a 20 MHz bandwidth as a radio access technology. However, radio access technologies that can be used by the LTE system are not limited to the above example. Furthermore, the eNBs 1a-05 through 1a-20 may apply adaptive modulation & coding (hereinafter abbreviated as AMC) to determine a modulation scheme and a channel coding rate according to channel states for UEs. The S-GW 1a-30 is an entity for providing a data bearer and creates or deletes the data bearer according to control by the MME 1a-25. The MME 1a-25 is responsible for performing various control functions as well as mobility management for a UE and is connected to a plurality of BSs.

FIG. 1B illustrates a radio protocol architecture for an LTE system, according to an embodiment of the disclosure.

Referring to FIG. 1B, a radio protocol stack for each of a UE and an eNB in the LTE system may include packet data convergence protocol (PDCP) 1b-05 or 1b-40, radio link control (RLC) 1b-10 or 1b-35, and medium access control (MAC) 1b-15 or 1b-30. The PDCP 1b-05 or 1b-40 may be responsible for performing compression/decompression of an IP header. The main functions of the PDCP 1b-05 or 1b-40 are summarized as follows, but are not limited thereto: header compression and decompression (robust header compression (ROHC) only); transfer of user data; in-sequence delivery of higher layer packet data units (PDUs) at PDCP re-establishment procedure for RLC acknowledged mode (AM); sequence reordering (for split bearers in dual connectivity (DC) (only support for RLC AM): PDCP PDU routing for transmission and PDCP PDU reordering for reception); duplicate detection of lower layer service data units (SDUs) at PDCP re-establishment procedure for RLC AM; retransmission of PDCP SDUs at handover, and for split bearers in DC, retransmission of PDCP PDUs at PDCP data-recovery procedure for RLC AM; ciphering and deciphering; timer-based SDU discard in uplink; the RLC 1b-10 or 1b-35 may reconfigure PDCP PDUs of appropriate size to perform an automatic repeat request (ARQ) operation. The main functions of the RLC 1b-10 or 1b-35 may be summarized as follows, but are not limited thereto; transfer of upper layer PDUs; error correction through ARQ (only for AM data transfer); concatenation, segmentation and reassembly of RLC SDUs (only for UM and AM data transfer); re-segmentation of RLC data PDUs (only for AM data transfer); reordering of RLC data PDUs (only for unacknowledged mode (UM) and AM data transfer); duplicate detection (only for UM and AM data transfer); protocol error detection (only for AM data transfer); RLC SDU discard (only for UM and AM data transfer); and RLC re-establishment.

The MAC b-15 or b-30 is connected with multiple RLC layers configured in a UE and may multiplex RLC PDUs into MAC PDUs and demultiplex RLC PDUs from MAC PDUs. The main functions of the MAC b-15 or b-30 may be summarized as follows, but are not limited thereto: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid ARQ (HARQ); priority handling between logical channels of one UE; priority handling between UEs by means of dynamic scheduling; multimedia broadcast/multicast service (MBMS) service identification; transport format selection; and padding.

A physical layer (hereinafter, also referred to as a PHY layer) 1b-20 or 1b-25 may transform higher-layer data into OFDM symbols by means of channel coding and modulation and transmit the OFDM symbols via a radio channel, or transform OFDM symbols received via a radio channel into higher-layer data by means of demodulation and channel decoding and transmit the higher-layer data to higher layers. Furthermore, HARQ is used for additional error correction at the physical layer, and at a receiving side, a UE transmits a 1-bit indicator indicating whether the UE has received packets from a transmitting side. The 1-bit indicator is called HARQ acknowledgement (ACK)/negative acknowledgement (NACK). Downlink HARQ ACK/NACK for uplink transmission may be transmitted via a physical HARQ indicator channel (PHICH), while uplink HARQ ACK/NACK for downlink transmission may be transmitted via a physical uplink control channel (PUCCH) or a physical uplink shared channel (PUSCH).

Moreover, the PHY layer may be configured to use one or more frequencies/carriers, and a technique for simultaneously configuring and using a plurality of frequencies is referred to as carrier aggregation (CA). According to the CA technique, a primary carrier and one or more secondary carriers may be employed in communication between a UE and a BS (evolved universal terrestrial radio access network (E-UTRAN) NodeB or eNB), thereby significantly increasing a data rate in proportion to the number of secondary carriers employed. In LTE, a cell in a BS using a primary carrier is termed a primary cell (PCell), and the cell using a secondary carrier is termed a secondary cell (SCell).

Although not shown in FIG. 1B, a radio resource control (RRC) layer may exist on top of the PDCP layer at each of the UE and the BS. The RRC layer may exchange connection and measurement configuration control messages for controlling radio resources.

FIG. 1C illustrates a structure of a next-generation mobile communication system according to an embodiment of the disclosure.

Referring to FIG. 1A, a radio access network for the next-generation mobile communication system consists of a next-generation BS, i.e., new ratio node B (hereinafter, referred to as NR NB, NR gNB, gNB, or NR BS) 1c-10 and a NR core network (NR CN) (or next-generation CN) 1c-05. An NR UE (or terminal) 1c-15 connects to an external network via the NR NB 1c-10 and the NR CN 1c-05.

In FIG. 1C, the NRNB 1c-10 corresponds to an eNB in the existing LTE system. The NR NB 1c-10 may be connected to the NR UE 1c-15 via a radio channel and provide a higher level of service than the existing node B. In the next-generation mobile communication system, as all user traffic is served on shared channels, an entity is needed to perform scheduling by collecting status information such as buffer states, available transmit power states and channel states for UEs. The NR NB 1c-10 may perform this scheduling function. In general, one NR NB controls a plurality of cells. According to an embodiment of the disclosure, to provide ultra-high-speed data transfer as compared to LTE, the next-generation mobile communication system may have bandwidths wider than the existing maximum bandwidth and utilize OFDM as a radio access technology together with an additional beamforming technique. Furthermore, the NR NB 1c-10 may apply AMC to determine a modulation scheme and a channel coding rate according to a channel state for the NR UE 1c-15. The NR CN 1c-05 may perform functions such as mobility support, bearer configuration, quality of service (QoS) configuration, etc. The NR CN 1c-05 is an entity responsible for performing various control functions as well as mobility management for a UE and is connected to a plurality of BSs. Furthermore, the next-generation mobile communication system may operate in conjunction with the existing LTE system, and the NR CN 1c-05 is connected with an MME 1c-25 through a network interface. The MME 1c-25 is connected to an eNB 1c-30 that is the existing BS.

FIG. 1D illustrates a radio protocol architecture for a next-generation mobile communication system, according to an embodiment of the disclosure.

Referring to FIG. 1D, a radio protocol stack for each of a UE and an NR base station in the next-generation mobile communication system includes NR service data adaptation protocol (NR SDAP) 1d-01 or 1d-45, NR PDCP 1d-05 or 1d-40, NR RLC 1d-10 or 1d-35, and NR MAC 1d-15 or 1d-30.

According to an embodiment of the disclosure, main functions of the NR SDAP 1d-01 or 1d-45 may include some of the following, However, the functions of the NR SDAP 1d-01 or 1d-45 are not limited to the following: transfer of user plane data; mapping between a QoS flow and a data radio bearer (DRB) for both downlink and uplink; marking a QoS flow ID in both downlink and uplink packets; and reflective QoS flow to DRB mapping for uplink SDAP PDUs.

For a SDAP layer, the UE may receive via an RRC message a configuration as to whether to use a header of the SDAP layer or a function of the SDAP layer per PDCP layer, per bearer, or per logical channel. When an SDAP header is configured, a 1-bit non-access stratum (NAS) reflective QoS indicator and a 1-bit AS reflective QoS indicator in the SDAP header may instruct the UE to update or reconfigure information about mapping between a QoS flow to a DRB for uplink and downlink. The SDAP header may include QoS flow ID information identifying QoS. Furthermore, according to an embodiment of the disclosure, QoS information may be used as a priority for data processing, scheduling information, etc. to support a smooth service.

According to an embodiment of the disclosure, main functions of the NR PDCP 1d-05 or 1d-40 may include some of the following functions. However, the functions of the NR PDCP 1d-05 or 1d-40 are not limited to the following example: header compression and decompression: ROHC only; transfer of user data; in-sequence delivery of upper layer PDUs; out-of-sequence delivery of upper layer PDUs; PDCP PDU reordering for reception; duplicate detection of lower layer SDUs; retransmission of PDCP SDUs; ciphering and deciphering; and timer-based SDU discard in uplink.

According to an embodiment of the disclosure, the reordering function of an NR PDCP entity may refer to a function of sequentially reordering PDCP PDUs received from a lower layer based on a PDCP sequence number (SN). The reordering function of the NR PDCP entity may include at least one of a function of transmitting data to a higher layer in a rearranged order, a function of directly transmitting data to a higher layer without taking the order into account, a function of rearranging an order of PDCP PDUs and recording missing PDCP PDUs, a function of submitting a status report indicating missing PDCP PDUs to a transmitting side, or a function of requesting retransmission of missing PDCP PDUs.

According to an embodiment of the disclosure, main functions of the NR RLC 1d-10 or 1d-35 may include some of the following. However, the functions of the NR RLC 1d-10 or 1d-35 are not limited to the following: transfer of upper layer PDUs; in-sequence delivery of upper layer PDUs; out-of-sequence delivery of upper layer PDUs; error correction through ARQ; concatenation, segmentation and reassembly of RLC SDUs; re-segmentation of RLC data PDUs; reordering of RLC data PDUs; duplicate detection; protocol error detection; RLC SDU discard; and RLC re-establishment.

According to an embodiment of the disclosure, the in-sequence delivery function of an NR RLC entity may refer to a function of sequentially transmitting RLC SDUs received from a lower layer to a higher layer. The in-sequence delivery function may include at least one of a function of, when one RLC SDU is segmented into multiple RLC SDUs and received, reassembling and transmitting the multiple RLC SDUs, a function of reordering received RLC PDUs based on an RLC SN or a PDCP SN, a function of rearranging the order of RLC PDUs and recording missing RLC PDUs, a function of submitting a status report indicating missing RLC PDUs to a transmitting side, a function of requesting retransmission of missing RLC PDUs, a function of sequentially transmitting, when there is a missing RLC SDU, only RLC SDUs preceding the missing RLC SDU to a higher layer, a function of sequentially transmitting all of the RLC SDUs received before a given timer restarts to a higher layer when the timer expires before a missing RLC SDU is received, or a function of sequentially transmitting all of the RLC SDUs received so far to a higher layer when the given timer expires before a missing RLC SDU is received.

Furthermore, according to an embodiment of the disclosure, the NR RLC entity may process RLC PDUs in an order that the RLC PDUs are received (in an order of arrival regardless of the order of serial numbers or SNs) and transmit the RLC PDUs to a PDCP entity regardless of their order (e.g., out-of-sequence delivery). Alternatively, the NR RLC entity may receive segments stored in a buffer or segments to be subsequently received to reconfigure the segments into one complete RLC PDU and then process the RLC PDU for transmission to the PDCP entity.

According to an embodiment of the disclosure, the NR RLC layer may not include a concatenation function. The concatenation function may be performed at the NR MAC layer or be replaced with the multiplexing function of the NR MAC layer.

The out-of-sequence delivery function of the NR RLC entity refers to a function of directly transmitting RLC SDUs received from a lower layer to a higher layer regardless of their orders. The out-of-sequence delivery function may include at least one of a function of, when one RLC SDU is segmented into multiple RLC SDUs and received, reassembling and transmitting the multiple RLC SDUs or a function of storing RLC SNs or PDCP SNs of received RLC PDUs, arranging the RLC PDUs in a sequential order according to the RLC SNs or PDCP SNs, and recording missing RLC PDUs.

According to an embodiment of the disclosure, the NR MAC 1d-15 or 1d-30 may be connected to multiple NR RLC layers configured in the UE. Main functions of the NR MAC 1d-15 or 1d-30 may include some of the following, However, the functions of the NR MAC 1d-15 or 1d-30 are not limited to the following: mapping between logical channels and transport channels; multiplexing/demultiplexing of the MAC SDUs; scheduling information reporting; error correction through HARQ; priority handling between logical channels of one UE; priority handling between UEs by means of dynamic scheduling; MBMS service identification; transport format selection; and padding.

According to an embodiment of the disclosure, an NR PHY layer 1d-20 or 1d-25 may transform higher-layer data into OFDM symbols by means of channel coding and modulation and transmit the OFDM symbols via a radio channel, or transform OFDM symbols received via a radio channel into higher-layer data by means of demodulation and channel decoding and transmit the higher-layer data to higher layers. However, operations of the NR PHY layer 1d-20 or 1d-25 are not limited thereto.

FIG. 1E illustrates a structure of a next-generation mobile communication system according to an embodiment of the disclosure.

Referring to FIG. 1E, a cell served by an NR gNB 1e-05 operating based on beams may include a plurality of transmission reception points (TRPs) 1e-10, 1e-15, 1e-20, 1e-25, 1e-30, 1e-35 and 1e-40. The TRPs 1e-10 through 1e-40 represent a functional block implementing at least one function that is separated from functions of the existing BS, e.g., a part of a function of transmitting and receiving physical signals, and each of the TRPs 1e-10 through 1e-40 includes a plurality of antennas.

According to an embodiment of the disclosure, an NR gNB 1e-05 may be represented as a central unit (CU), and each TRP may be represented as a distributed unit (DU). Functions of the NR gNB 1e-05 and the TRP may each include some of the PDCP/RLC/MAC/PHY layers shown in 1e-45 of FIG. 1E and functions of the corresponding layers. For example, the TRPs 1e-15 and 1e-25 only with the PHY layer may perform a function of the corresponding layer, the TRPs 1e-10, 1e-35, and 1e-40 only with the PHY layer and the MAC layer may perform functions of the corresponding layers, and the TRPs 1e-20 and 1e-30 only with the PHY layer, the MAC layer, and the RLC layer may perform functions of the corresponding layers.

According to an embodiment of the disclosure, the TRPs 1e-10 through 1e-40 may use a beamforming technique for generating narrow beams in various directions via a plurality of transmit and receive antennas in order to transmit and receive data. A user terminal 1e-60, i.e., access and mobility management function (AMF)/session management function (SMF) 1e-50 may connect to the NR gNB 1e-05 and an external network through the TRPs 1e-10 through 1e-40. To provide users with services, the NR gNB 1e-05 may schedule UEs based on collected status information such as the UEs' buffer states, available transmit power states and channel states, and in particular, may support a connection between each UE and a CN, in particular, the AMF/SMF 1e-50.

FIG. 1F illustrates a frame structure used in an NR system, according to an embodiment of the disclosure Referring to FIG. 4C, the NR system aims at higher data rates compared to an LTE system and considers the use of high frequencies to ensure wider frequency bandwidths. More particularly, a scenario for the NR system may be considered in which directional beams are generated at high frequencies and data are transmitted at a high rate to a UE by using the directional beams.

Thus, it is possible to consider a scenario in which an NR gNB or TRP 1f-01 communicates with first through fifth UEs 1f-71, 1f-73, 1f-75, 1f-77, and 1f-79 in a cell by using different beams for each UE. For example, in FIG. 1F, a scenario is assumed in which the first UE 1f-71 communicates with the TRP 1f-01 using beam #1 1f-51, the second UE 1f-73 communicates therewith using beam #5 1f-55, and the third through fifth UEs 1f-75 through 1f-79 communicate therewith using beam #7 1f-57.

To identify beams used by UEs to communicate with the TRP 1f-01, an overhead subframe (OSF) 1f-03 in which a common overhead signal is transmitted is present in the time domain. The OSF 1f-03 may contain a primary synchronization signal (PSS) for acquiring the timing of OFDM symbols, a secondary synchronization signal (SSS) for detecting a cell identification (ID), etc. Furthermore, the base station may transmit to a UE a physical broadcast channel (PBCH) carrying system information, master information block (MIB), or information necessary for the UE to access a system (e.g., a downlink beam bandwidth, a system frame number, etc.). Furthermore, in the OSF 1f-03, the base station may transmit a reference signal by using a different beam for each symbol (or over several symbols). The UE may derive a beam index for identifying each beam from the reference signal.

It is assumed in FIG. 1F that the NR gNB transmits 12 beams beam #1 1f-51 through beam #12 1f-62 and that a different beam is swept and transmitted for each symbol in the OSF 1f-03. For example, as a different beam is transmitted at each symbol (e.g., transmission of beam #1 1f-51 at a first symbol 1f-31) in the OSF 1f-03, the UE may measure the OSF 1f-03 to identify a beam for a signal with a highest signal strength among beams transmitted in the OSF 1f-03.

In FIG. 1F, a scenario is assumed that the OSF 1f-093 is repeated every 25 subframes, and in the scenario, the remaining 24 subframes are data subframes (DSFs) 1f-05 in which general data is transmitted and received. Furthermore, according to scheduling by the base station, the third through fifth UEs 1f-75, 1f-77, and 1f-79 may communicate using beam #7 1f-11 in common, the first UE 1f-71 may communicate using beam #1 1f-13, and the second UE 1f-73 73 may communicate using beam #5 1f-55. Although FIG. 1F mainly illustrates transmission beams #1 through #12 1f-51 through 1f-62 of the base station, it is possible to consider reception beams of a UE (e.g., reception beams 1f-81, 1f-83, 1f-85, 1f-87 of the first UE 1f-71) for receiving transmission beams from the base station may be additionally considered. For example, referring to FIG. 1F, the first UE 1f-71 may have the four reception beams 1f-81, 1f-83, 1f-85, and 1f-87 and perform beam sweeping to identify a beam with the best reception performance from among the four reception beams 1f-81, 1f-83, 1f-85, and 1f-87. Here, when the UE is unable to use a plurality of beams at the same time, the UE may receive as many OSFs as the number of reception beams, one reception beam for each OSF. By receiving a plurality of OSFs respectively corresponding to a plurality of reception beams, the UE may find an optimal pair of a transmission beam of the base station and a reception beam of the UE.

In the disclosure, in conjunction with a transmission configuration indicator (TCI) state used by the base station to indicate a beam used when a UE receives a resource transmitted through a physical downlink shared channel (PDSCH) in a next-generation mobile communication system, a method of improving a related operation in LTE standard specification is considered. Although a UE receives an indication of a downlink beam transmitted via a single TRP according to the related art, the UE may receive an indication of downlink beams transmitted from multiple TRPs in a future NR system. However, according to the current standard specifications, because there is no method by which a base station indicates downlink beams transmitted via multiple TRPs, an operation for solving this is required.

FIG. 1G illustrates the entire process of indicating, by a base station in an NR system, a beam for a downlink signal transmitted via a PDSCH, according to an embodiment of the disclosure.

The NR system is designed to perform data transmission and reception between a UE and a base station by using directional beams. Although data communication using a directional beam may support a high data rate through a wide bandwidth and resources related to communication using high frequencies, it may have a limitation that the direction of a beam should be appropriately determined.

In the NR system, basically, the UE may measure a synchronization signal through a synchronization signal/ physical broadcast channel (SS/PBCH) block at an initial access phase may perform data transmission and reception in a beam direction in which the synchronization signal is detected. The base station may configure up to 64 downlink beams for the UE via an RRC message, the downlink beams being used for transmission through a physical downlink control channel (PDCCH), and one beam actually used from among the configured downlink beams may be indicated via a MAC control element (MAC CE). Furthermore, the base station performs an operation of configuring and indicating a downlink beam used for transmission through a PDSCH. In addition, under a predetermined condition, a downlink beam for transmission through the PDCCH may be used instead of a downlink beam for transmission through the PDSCH. For example, the predetermined condition may be a case in which the time required to switch a downlink beam for PDCCH to a downlink beam for PDSCH is shorter than a processing time required to perform the operation.

Referring to FIG. 1G, a UE 1g-20 may receive beam configuration for beam directions 1g-06 through 1g-10 of beams in which a channel state information-reference signal (CSI-RS) resource set 1g-15 is transmitted from the base station and the TRP 1g-05 connected to the UE 1g-20. The beam direction configuration is applicable to a beam via which all transmission resources delivered through a PDSCH are transmitted, and the entire process is as follows.

In one example of operation 1g-25, configure, via RRC configuration, a transmission configuration indicator (TCI) state in a PDSCH-Config for each bandwidth part (BWP) of a serving cell (up to 128 beams can be configured as per LTE standard specification).

In one example of operation 1g-30: indicate to the UE a candidate beam group for activating a TCI state by using a MAC CE, the TCI state being configured by an RRC message and corresponding to a beam via which the PDSCH is transmitted (up to 8 beams, i.e., up to 8 TCI states can be activated as per LTE standard specification). The purpose of the MAC CE may be to select candidate beams that can be dynamically indicated via downlink control information (DCI) among TCI states configured via RRC. Furthermore, the MAC CE may be used to reduce the number of TCI states to be managed by the UE and the number of bits indicated in the DCI.

In one example of operation 1g-35, indicate a specific beam among the candidate beams indicated by the MAC CE via an indicator of DCI (composed of 3 bits as per Rel-15).

FIG. 1H illustrates the entire process of indicating, by a base station in an NR system, a beam group for downlink signals transmitted in a PDSCH via a plurality of transmission reception points (TRPs), according to an embodiment of the disclosure.

As described with reference to FIG. 1G, the NR system is designed to perform data transmission and reception between a UE and a base station by using directional beams. Although a procedure for configuring and indicating a downlink beam transmitted from a single TRP has been defined in the LTE standard specification, in a future NR system, multiple TRPs may simultaneously transmit downlink transmissions (for example, downlink transmissions of associated with a same transport block (TB)) by using beams configured for one UE. In other words, the UE may simultaneously receive a configuration for two beams at once, and to simultaneously receive the indication of the two beams, RRC configuration, MAC CE design, and DCI indication operation may need to be modified. Hereinafter, embodiments of the disclosure provided methods for supporting indication of a plurality of beams to a UE.

Referring to FIG. 1H, a UE 1h-25 may receive beam configuration of beam directions 1h-15 through 1h-20 in which a CSI-RS resource and a downlink resource are transmitted from the base station and multiple TRPs, i.e., first and second TRPs 1h-05 and 1h-10, connected to the UE 1h-25. The beam direction configuration may cover all of the first and second TRPs 1h-05 and 1h-10, and the UE may be able to simultaneously receive a beam direction for one or more TRPs.

In one example of operation 1h-30, configure, via RRC configuration, a TCI state in a PDSCH-Config for each bandwidth part (BWP) of a serving cell. (In the configuration, TCI states for multiple TRPs (e.g., the first TRP 1h-05 and the second TRP 1h-10) may be provided as a list in one tci-state field. Alternatively, a separate field (e.g., tci-state-multipleTRP) for distinguishing the TCI states from an existing TCI state may be defined. The TCI states associated with the multiple TRPs and the newly introduced tci-state-MultipleTRP field may be set to a maximum of 128 values with reference to LTE standard specification, and of course, may be set to 128 or more values.

Alternatively, in the RRC configuration operation, a tci-state-group field consisting of a combination of the TCI states transmitted from the first TRP 1h-05 and the second TRP 1h-10 may be defined, and the content of the tci-state-group field may be configured. For example, the tci-state-group field may be configured as {(tci-state #1), (tci-state #1, tci-state #2), (tci-state #2, tci-state #3), . . . , (tci-state #128)}. The maximum number of combinations in the tci-state-group field may be set to 128 or greater with reference to LTE standard specification).

In one example of operation 1h-35, indicate to the UE candidate beam groups (for example, candidate codepoints) for activating TCI states (or tci-state-MultipleTRP or tci-state-group) by using a MAC CE, the TCI states being configured by an RRC message and corresponding to beams over which the PDSCH is transmitted through the multiple TRPs. (The purpose of the MAC CE may be to select a candidate beam group (for example, a candidate codepoint) that can be dynamically indicated via DCI among beams corresponding to TCI states (redefined TCI states, tci-state-multipleTRP, or tci-state-group) configured via RRC. Furthermore, the MAC CE may be used to reduce the number of TCI states to be managed by the UE and the number of bits indicated in the DCI.

According to the function defined in the previous LTE standard specification, in the related art, a MAC CE may indicate up to eight candidate beams, and only configuration of a beam for a single TRP is available because only one of the candidate beams can be indicated by DCI. However, because there may be a case in which beams for multiple TRPs are indicated, the modified MAC CE may be able to indicate activation of the plurality of beams at the same time. The maximum number of beam groups transmitted may be extended to eight or sixteen. That is, a candidate activation beam group may consist of a combination of downlink beams transmitted by using multiple TRPs or beams transmitted via a single TRP).

In one example of operation 1h-40, indicate a specific beam group (for example, a specific codepoint) among candidate beam groups indicated by the MAC CE via an indicator of DCI. (As per LTE standard specification, indicator bits consist of 3 bits, and in the disclosure, may be composed of 3 or 4 bits. The indicator bits may be determined according to the number of beam groups indicated by the MAC CE. The beam group indicated via the DCI in operation 1h-40 means a direction of a downlink beam transmitted from the multiple TRPs. In other words, the beam group indicated via the DCI in operation 1h-40 corresponds to one of the candidate beam groups for activation indicated in operation 1h-35.)

In the following embodiments of the disclosure, methods for supporting the system described with reference to FIG. 1H, and in particular, the structure of the MAC CE and RRC configuration will be described. Matters to be considered for downlink beam indication in the multi-TRP system of FIG. 1H are as follows. Hereinafter, a "code point" (or, a codepoint) may be information (or value) indicated by the MAC CE in operation 1h-35. For example, the code point may include single beam information or beam group information indicated by the MAC CE.

In one example, one or two TRPs (or TCI states) may be included in one code point (a beam group indicated by the MAC CE). In other words, a downlink transmission may be a transmission from a single TRP or may be transmissions from multiple TRPs.

In one example, the maximum number of code points activated in the MAC CE may be 8 or 16.

In one example, in association with a maximum code point, the number of DCI activation indication bits may be determined to be 3 or 4.

In one example, the newly defined MAC CE may be able to distinguish code points. In other words, directions of beams transmitted simultaneously from the first TRP 1h-05 and the second TRP 1h-10 (for examples, directions of beams associated with a same transport block (TB)) may be configured in one code point as a beam combination.

In one example, it is possible to solve beam indication in the multi-TRP system by changing a MAC CE alone or in association with an RRC.

In one example of a solution based on RRC change: a new field (e.g., TCI-StateMultipleTRP) is defined and 128 code points in the new field are arranged as a list. The code point consists of up to two TCI states; and the new MAC CE uses a "V" field instead of the existing "R" field, and when the "V" field is set to 1, the MAC CE applies the newly defined TCI-StateMultipleTRP instead of the TCI-State configured via the existing RRC message.

In one example of a solution based on MAC CE change: a TCI-State configured in the existing RRC is maintained. Alternatively, the structure of the TCI-State configuration may be maintained, but actually configured TCI state may be indicated considering multiple TRPs; and a new MAC CE is designed to simultaneously indicate a plurality of beam groups.

A method provided in the following embodiment of the disclosure is for applying a MAC CE defined in LTE standard specification as TCI states activation/deactivation for UE-specific PDSCH MAC CE to multiple TRPs, which will be understood with reference to the existing MAC CE structure.

FIG. 1I illustrates a MAC CE structure and a method of activating a candidate downlink beam group transmitted from multiple TRPs, according to an embodiment of the disclosure.

According to an embodiment of the disclosure, the MAC CE structure provided with reference to FIG. 1I may correspond to reused "TCI states activation/deactivation for UE-specific PDSCH MAC CE" currently defined in the LTE standard specification. That is, a logical channel ID (LCD) for the MAC CE structure shown in FIG. 1I may have the same value as the previously defined LCD.

When a field 1i-05 previously set to an "R" field is set to a "V" field and the "V" field is set to 1 in a MAC CE structure, the MAC CE structure is defined to be a MAC CE structure supporting multiple TRPs as specified in LTE standard specification. Furthermore, as in a previous version of MAC CE, a serving cell ID field 1i-10 and a BWP ID field 1i-15 are included in the MAC CE to respectively indicate a serving cell to which a beam belongs and a BWP.

A difference from the previous version of MAC CE is that the previous version of MAC CE indicates up to eight candidate downlink activation beams ("T" fields) while in the MAC CE structure shown in FIG. 1I, beams for TRP 1 and TRP 2 successively form the same combination.

For example, in the existing MAC CE structure, eight "T" fields are set to 1. On the other hand, in the new MAC CE structure, sixteen "T" fields 1i-20 corresponding to double the eight "T" fields may be all set to 1, and first and second activated fields may form a combination for fields activated with 1 to indicate a first beam combination for TRP1 and TRP 2. Similarly, third and fourth activated fields may form a combination to indicate a second beam combination for TRP 1 and TRP 2. In the same manner, fifteenth and sixteenth activated fields may form a combination to indicate an eighth beam combination for TRP 1 and TRP 2.

The above-described MAC CE structure may be used under the assumption that each combination for TRP 1 and TRP 2 may always consist of two activated fields. The MAC CE structure is also characterized in that "T" fields having a number corresponding to a multiple of 2 are always activated. In addition, in the above-described MAC CE structure, as many code points as the number of the set "T" fields divided by two may be set.

FIG. 1J illustrates a MAC CE structure and a method of activating a candidate downlink beam group transmitted from multiple TRPs, according to an embodiment of the disclosure.

A MAC CE structure provided with reference to FIG. 1J may be similar to that shown in FIG. 1I in the MAC CE structure corresponding to the "TCI states activation/deactivation for UE-specific PDSCH MAC CE" currently defined in the LTE standard specification is reused. (i.e., an LCD for the MAC CE structure shown in FIG. 1J has the same value as the previously defined LCD). However, the MAC CE structure provided with reference to FIG. 1J differs from the existing MAC CE structure in size, and the MAC CE structure provided with reference to FIG. 1J differs from the MAC CE structure provided with reference to FIG. 1I in that the MAC CE structure provided with reference to FIG. 1J is further extended.

As in FIG. 1I, a new "V" field may be introduced in 1j-05 to distinguish a MAC CE format in the previous LTE standard specification from a MAC CE format in the LTE standard specification. When the "V" field is set to 1, the MAC CE structure is defined to be a MAC CE structure supporting multiple TRPs as specified in LTE standard specification. Furthermore, as in a previous version of MAC CE, a serving cell ID field 1j-10 and a BWP ID field 1j-15 are included in the MAC CE structure to respectively indicate a serving cell to which a beam belongs and a BWP.

In addition, "T" fields 1j-20 represent beams activated in TRP 1 as in the existing "T" fields. When the number of activated "T" fields is set to N, N sets of "C" fields 1j-25 and N sets of "TCI state ID" fields 1j-30 may be present in the MAC CE structure. Furthermore, a combination of the "C" field 1j-25 and the "TCI state ID" field 1j-30 is sequentially mapped to the activated "T" field. For example, a first activated "T" field, a first "C" field, and a first "TCI state ID" field are mapped as one combination.

The "TCI state ID" field 1*j*-30 is used to indicate a beam applied to TRP 2 and may have a length of 7 bits. In other words, because the maximum number of TCI states configured via RRC is 128, the "TCI state ID" field 1*j*-30 may be set to 7 bits to indicate a candidate beam that may be configured in TRP 2. When the number of TCI states that can be configured via RRC increases, the size of the "TCI state ID" field 1*j*-30 may also increase correspondingly.

The "C" field 1*j*-25 is an indicator indicating whether the "TCI state ID" field 1*j*-30 that may be present later actually exists in the MAC CE structure. When the "C" field 1*j*-25 is set to 1, "TCI state ID" field to be present later indicates a TCI state for TRP 2. When the "C" field 1*j*-25 is set to 0, the "TCI state ID" field to be present later is filled with a meaningless value. In other words, the UE may ignore the "TCI state ID" field 1*j*-30, or the base station may set the "TCI state ID" field 1*j*-30 to the same ID as that of an activated TCI state indicating a beam from the TRP 1.

FIG. 1K illustrates a MAC CE structure and a method of activating a candidate downlink beam group transmitted from multiple TRPs, according to an embodiment of the disclosure.

In an embodiment of the disclosure provided with reference to FIG. 1K, a new MAC CE for indicating a downlink beam group via multiple TRPs is introduced. For example, a new MAC CE structure different from the existing TCI state activation/deactivation MAC CE for the PDSCH may be introduced, and a new LCID may be used. According to the embodiment provided with reference to FIG. 1K, a MAC CE may be designed to have a completely new structure, so that the MAC CE may be designed with an optimal structure indicating a downlink beam group via multiple TRPs.

Referring to FIG. 1K, the new MAC CE structure is similar to the existing MAC CE structure in that an "R" field 1*k*-05, a serving cell ID field 1*k*-10, and a BWP ID field 1*k*-15 indicate a serving cell to which a beam group indicated by the MAC CE belongs and a BWP. In the following description, a MAC CE 1*k*-01 according to a first option is distinguished from a MAC CE 1*k*-02 according to a second option depending on the presence/absence of a subfield, in particular, a "TCI code ID" field.

First, the MAC CE 1*k*-01 according to the first option will be described. A subsequent field group excluding the "R" field 1*k*-05, the serving cell ID field 1*k*-10, and the BWP ID field 1*k*-15 may be able to indicate TCI state IDs (via TCI state ID fields 1*k*-30, 1*k*-35, 1*k*-50, and 1*k*-55) identifying TCI states used for TRP1 and TRP2 and may explicitly allocate TCI code ID fields 1*k*-20 and 1*k*-40 to which TCI code points are assigned. Furthermore, "C" fields 1*k*-25 and 1*k*-45 are configured as indicators indicating the presence of TCI state IDs (i.e., the TCI state ID fields 1*k*-35 and 1*k*-55) corresponding to downlink beams indicated via TRP 2.

For example, the MAC CE 1*k*-01 according to the first option may have a structure as follows: R field (1bit)+serving cell ID (5 bits)+BWP ID (2 bits)+a set of {TCI code ID (3~leits)+indication for TRP2 TCI state (1 bit)+TCI state for TRP1 (7 bits)+reserved bit (1 bit)+TCI state for TRP2 (7 bits)}.

Unlike in the MAC CE 1*k*-01 according to the first option, a "TCI code ID" field may be omitted in the MAC CE 1*k*-02 according to the second option. Even when there is no "TCI code ID" field, TCI states may be sequentially indicated by the MAC CE, and the UE may infer the total number of TCI codes indicated through a size of the entire MAC CE.

For example, the MAC CE 1*k*-02 according to the second option may have a structure as follows. R field (1 bit)+serving cell ID (5 bits)+BWP ID (2 bits)+a set of {indication for TRP2 TCI state (1 bit)+TCI state for TRP1 (7 bits)+reserved bit (1 bit)+TCI state for TRP2 (7 bits)}.

In the MAC CE 1*k*-02, each of TCI state IDx (x is one of 1, 2, . . . , N) may correspond to one codepoint. One codepoint may include a TCI state ID for TRP1 and may additionally include a TCI state ID for TRP2.

According to the embodiment provided with reference to FIG. 1K, a new MAC CE is introduced without reusing the existing MAC CE. In this embodiment, a new LCID may be required. When the UE receives a MAC PDU, the UE checks the LCID through the sub-header information of the received MAC PDU, and identifies that the received MAC CE is a new MAC CE which may be used to activate/deactivate two or more TCI states corresponding to multiple TRPs by only one PDCCH.

According to the embodiment provided with reference to FIG. 1K, by introducing the "C" field in the MAC CE, it is possible to indicate whether an indication for TRP2 exists for each TCI code points activated by the MAC CE. Through the introduction of the "C" field, the MAC CE size can be flexibly adjusted, and in the case where the TCI state indication for TRP2 is not required, the overhead of the corresponding 1 byte can be reduced, thereby reducing the signaling load.

FIG. 1L illustrates a MAC CE structure and a method of activating a candidate downlink beam group transmitted from multiple TRPs, according to an embodiment of the disclosure.

According to an embodiment of the disclosure provided with reference to FIG. 1L, a newly introduced MAC CE includes only a portion that cannot be indicated by the above-described existing MAC CE while reusing a MAC CE corresponding to "TCI states activation/deactivation for UE-specific PDSCH MAC CE" currently defined in the LTE standard specification. In other words, according to the embodiment provided with reference to FIG. 1L, to indicate downlink beams for TRP 1 and TRP 2, configuration information may be transmitted by transmitting the newly defined MAC CE together with the existing MAC CE.

Referring to FIG. 1L, the existing MAC CE structure 1*l*-03 includes a reserved bit 1*l*-05, a serving cell ID field 1*l*-10, a BWP ID field 1*l*-15, and TCI state bitmap "T" fields 1*l*-20 indicating activation. The existing MAC CE structure 1*l*-03 may indicate a candidate downlink activation beam for TRP 1. A new MAC CE structure for indicating a candidate downlink activation beam for TRP 2 may be defined according to two options.

First, a MAC CE 1*l*-01 according to a first option will be described. the MAC CE 1*l*-01 according to the first option may be able to indicate TCI state IDs (via TCI state ID fields 1*l*-50 and 1*l*-65) identifying TCI states used for TRP2 corresponding to TRP1 and may explicitly allocate TCI code ID fields 1*l*-40 and 1*l*-55 for mapping the same TCI code points as for TRP1. Furthermore, "C" fields 1*l*-45 and 1*l*-60 are configured as indicators indicating the presence of TCI state IDs (indicated via the TCI state ID fields 1*l*-50 and 1*l*-65) corresponding to downlink beams indicated via TRP 2. When the "C" fields 1*l*-45 and 1*l*-60 are set to 1, the TCI state ID fields 1*l*-50 and 1*l*-65 indicating TCI state IDs corresponding to downlink beams indicated via TRP 2 are present. When the "C" fields 1*l*-45 and 1*l*-60 are set to 0, there is no beam indicated through TRP 2. When the "C" fields 1*l*-45 and 1*l*-60 are set to 0, the UE may ignore the TCI state ID fields 1*l*-50 and 1*l*-65, or the base station may set the TCI state ID fields 1*l*-50 and 1*l*-65 to the same IDs as that of activated TCI states indicating beams from the TRP 1 respectively.

A MAC CE 1*l*-02 according to the second option differs from the MAC structure 1*l*-01 according to the first option in that the MAC CE 1*l*-02 does not include TCI code ID fields 1*l*-40 and 1*l*-55. The MAC CEs 1*l*-01 and 1*l*-02 according to the first and second options may respectively have the following structures: MAC CE 1*l*-01 according to first option: R field (1 bit)+serving cell ID (5 bits)+BWP ID (2 bits)+a set of {TCI code ID (3~leits)+indication for TRP2 TCI state (1 bit)+reserved bit (1 bit)+TCI state for TRP2 (7 bits)}; and MAC CE 1*l*-02 according to second option: R field (1 bit)+serving cell ID (5 bits)+BWP ID (2 bits)+a set of {indication for TRP2 TCI state (1 bit)+TCI state for TRP2 (7 bits)}.

According to an embodiment of the disclosure, in the newly defined MAC CE, a serving cell ID field and a BWP ID field may be omitted in a special situation. For example, the special situation may be a situation in which the existing MAC CE and the new MAC CE are transmitted in the same MAC PDU. Alternatively, when the serving cell ID field and the BWP ID field are omitted in the newly defined MAC CE, the MAC CE may be defined as having the same serving cell ID and BWP ID as in the previous MAC CE.

FIG. 1M illustrates a method, performed by a BS, configuring a downlink beam group via multiple TRPs and communicating with a UE, according to an embodiment of the disclosure.

Referring to FIG. 1M, a UE 1*m*-01 in an idle mode RRC IDLE searches for a suitable cell and camps on a gNB 1*m*-03 (operation 1*m*-05). Upon generation of data to be transmitted or the like, the UE 1*m*-01 performs a connection to the gNB (operation 1*m*-10). While in an idle mode, the UE is not connected to a network for power saving or the like, so the UE cannot transmit data. The UE needs to switch the idle mode to a connected mode RRC CONNECTED for transmission of data. When the UE camps on a cell, the UE stays in the cell and receives a paging message to monitor whether data is incoming via a downlink. When the UE 1*m*-01 successfully establishes the connection to the gNB 1*m*-03, the UE transits to the connected mode RRC CONNECTED. The UE 1*m*-01 in the connected mode may transmit and receive data to and from the gNB 1*m*-03 (operation 1*m*-15).

When in the RRC-connected state, the gNB 1*m*-03 transmits configuration information related to a TCI state to the UE 1*m*-01 through an RRC message (operation 1*m*-20). An operation of transmitting the RRC message also includes an operation of configuring, through a TCI state, a downlink beam used for transmission via a PDCCH and a PDSCH. Downlink beam configuration is performed per serving cell and per BWP and is included in PDCCH-Config and PDSCH-Config, respectively. For example, in LTE standard specification, the gNB 1*m*-03 configures, via RRC messages, up to 64 downlink beams used for transmission through the PDCCH to the UE 1*m*-01, and one actually used beam from among downlink beams are indicated via a MAC CE. Furthermore, the gNB 1*m*-03 performs an operation of configuring and indicating a downlink beam used for transmission through the PDSCH. Moreover, under a predetermined condition, a downlink beam used for transmission through a PDCCH may be used instead of a downlink beam used for transmission through a PDSCH. For example, the predetermined condition may be a case where a processing time takes to switch a downlink beam for PDCCH to a downlink beam for PDSCH is shorter than a required processing time for performing the switching operation.

According to an embodiment of the disclosure, even when a downlink beam is indicated via multiple TRPs, a TCI state transmitted through a PDSCH from multiple TRPs for each serving cell and for each BWP may be configured in a manner similar to that described in operation 1*m*-20. As described above, the TCI state may be configured by reusing a TCI state field included in the existing RRC control information, or by introducing a new separate field. Furthermore, the maximum number of configurable TCI states may be 128 or greater (e.g., 256). When the TCI state field is set, an actual TCI state value set in the TCI state field may indicate beams for TRP1 and TRP2. Before transmitting the RRC message for configuring the TCI state to the UE 1*m*-01, the gNB 1*m*-03 may request UE capabilities and receive a UE capability report from the UE 1*m*-01 and analyze the gNB's TRP capabilities, UE capabilities for processing downlink beams via multiple TRPs, etc., to determine which TRP beam information is to be included in the TCI state based on an analysis result.

The gNB 1*m*-03 may activate a plurality of beams or beam groups that can be activated according to a position and a state of the UE 1*m*-01 among TCI state values set via RRC configuration information (operation 1*m*-25). As described in the foregoing operations, the gNB 1*m*-03 may determine which version of MAC CE is to be activated by the UE 1*m*-01. The gNB 1*m*-03 may indicate activation of candidate beams for a single TRP and candidate beam groups for multiple TRPs.

The gNB 1*m*-03 indicates, via an indicator of DCI, one code point among a plurality of downlink beam groups (code points) for which activation is indicated in operation 1*m*-25 (operation 1*m*-30).

The UE 1*m*-01 performs downlink data reception using a beam configured for communication with the gNB 1*m*-03 (operation 1*m*-35).

The gNB 1*m*-03 may retransmit the MAC CE for the purpose of updating the previously delivered MAC CE and may update beam groups that are respectively activated and deactivated (operation 1*m*-40).

The gNB 1*m*-03 may indicate one of the beam groups activated in operation 1*m*-40 and instruct the UE 1*m*-01 to use one of the beam groups as a downlink beam group (operation 1*m*-45).

FIG. 1N illustrates a flow chart of a UE according to an embodiment of the disclosure.

Referring to FIG. 1N, the UE performs an RRC connection procedure with a gNB and transits to an RRC connected state (operation 1*n*-05). The UE receives configuration information for a TCI state ("TCI state configuration information") from the gNB via a RRCReconfiguration message (operation 1*n*-10). The TCI state configuration information may include beam configuration information received via a PDCCH and beam configuration information received via a PDSCH. Furthermore, before receiving the TCI state configuration information, the UE may report UE capabilities to the gNB.

The TCI state configuration information refers to downlink beam configuration information of the UE. The TCI state configuration information may include beam group configuration information for multiple TRPs. For example, when the UE reports information indicating that the UE supports beam group configuration for multiple TRPs while reporting the UE capabilities, the TCI state configuration information may include beam group configuration information for the multiple TRPs.

The UE may receive a MAC CE indicating PDSCH beam group activation for multiple TRPs from the gNB (operation 1*n*-15). The MAC CE may have a structure described with reference to FIG. 1I, 1J, 1K, or 1L.

The UE may identify the type of the received MAC CE to determine whether the MAC CE is a beam activation indication for a single TRP or a beam activation indication for multiple TRPs and then perform different operations according to a determination result (operation 1n-20). For example, the UE may determine the type of MAC CE by checking an LCD value or a specific indicator (e. g., a "V" field) in the MAC CE.

When the received MAC CE is a beam activation MAC CE for a single TRP (e.g., MAC CE for the existing LTE standard specification), the UE may store an activated candidate beam (TCI state) applied to a single TRP (operation 1n-25). The UE may receive DCI including an indication of an actually used TCI state value from the gNB (operation 1n-30). The UE may perform downlink data reception and CSI reporting by using the indicated downlink beam (operation 1n-35).

When the MAC CE received by the UE in operation 1n-20 is a beam activation MAC CE for multiple TRPs (e. g., a newly defined MAC CE), the UE may store an activated candidate beam group (a TCI code point) applied to the multiple TRPs (operation 1n-40). The UE may receive DCI including an indication of an actually used TCI code point from the gNB (operation 1n-45). The UE may perform downlink data reception and CSI reporting by using an indicated downlink beam group (beam configurations for TRP 1 and TRP 2) (operation 1n-50).

FIG. 1O illustrates a flow chart of a gNB according to an embodiment of the disclosure.

Referring to FIG. 1O, the gNB may establish an RRC connection with a UE (operation 1o-05).

The gNB may request UE capabilities from the UE and receive UE capability information from the UE (operation 1o-10). The gNB may determine whether the UE is able to apply a downlink beam group configuration for multiple TRPs by analyzing the received UE capability information and check whether the UE is able to configure a downlink beam group for multiple TRPs to the UE (i.e., by checking whether the configuration for the multiple TRPs is possible and whether requirements necessary for the configuration are satisfied).

Based on a result of checking whether configuring the UE with transmissions using the multiple TRPs is possible, the gNB may provide the UE with TCI state configuration information via an RRC message, the TCI state configuration information including a beam configuration for the multiple TRPs according to UE capabilities and TRP support. When the UE has no capability for the configuration for the multiple TRPs or when the gNB determines that the configuration for the multiple TRPs is not necessary, the gNB may provide the UE with TCI state configuration information including a beam configuration for a single TRP instead of the TCI state configuration information including a beam configuration for the multiple TRPs.

The gNB may transmit to the UE a MAC CE indicating PDSCH beam group activation for multiple TRPs (operation 1o-20). The MAC CE may have a structure described with reference to FIG. 1I, 1J, 1K, or 1L. Furthermore, a method of determining a beam group indicated by the MAC CE may be determined based on beam reporting by the UE and information such as beam information previously configured to the UE. In addition, the gNB may always configure a beam combination for TRP 1 and TRP 2 when indicating a beam group via the MAC CE or may activate a beam from a single TRP.

The gNB may indicate, via DCI, one beam or beam group to be actually used for downlink data transmission among candidate activation beams or beam groups indicated by the MAC CE (operation 1o-25). For example, the gNB may indicate the beam or beam group to be used via a beam indicator included in the DCI.

The gNB transmits downlink data to the UE through a configured beam direction (operation 1o-30).

FIG. 1P illustrates an internal structure of a UE according to an embodiment of the disclosure.

Referring to FIG. 1P, the UE may include a radio frequency (RF) processor 1p-10, a baseband processor 1p-20, a storage 1p-30, and a controller 1p-40. The controller 1p-40 includes a multi-connectivity processor 1p-42. The internal structure of the UE is not limited to the above example, and the UE may include fewer or more components that those shown in FIG. 1P.

The RF processor 1p-10 performs a function for transmitting and receiving a signal via a radio channel, such as signal conversion between bands and amplification. For example, the RF processor 1p-10 may upconvert a baseband signal from the baseband processor 1p-20 into an RF signal and transmit the RF signal via an antenna, and downconvert an RF signal received via the antenna into a baseband signal. For example, the RF processor 1p-10 may include a transmit filter, a receive filter, an amplifier, a mixer, an oscillator, a digital to analog convertor (DAC), an analog to digital convertor (ADC), etc. Although only one antenna is shown in FIG. 1P, the UE may have a plurality of antennas.

The RF processor 1p-10 may also include a plurality of RF chains. Furthermore, the RF processor 1p-10 may perform beamforming. For beamforming, the RF processor 1p-10 may adjust a phase and a magnitude of each of the signals transmitted and received through a plurality of antennas or antenna elements. Furthermore, the RF processor 1p-10 may perform a MIMO operation during which multiple layers may be received. The RF processor 1p-10 may perform reception beam sweeping by appropriately configuring a plurality of antennas or antenna elements according to control by the controller 1p-40 or adjust a direction and width of a reception beam so that the reception beam is aligned with a transmission beam.

The baseband processor 1p-20 may perform a function for conversion between a baseband signal and a bit string according to the physical layer standard of the system. For example, when transmitting data, the baseband processor 1p-20 may generate complex symbols by encoding and modulating a transmission bit string. Furthermore, when receiving data, the baseband processor 1p-20 may reconstruct a reception bit string by demodulating and decoding a baseband signal from the RF processor 1p-10. For example, according to an OFDM scheme, when transmitting data, the baseband processor 1p-20 may generate complex symbols by encoding and modulating a transmission bit string, map the complex symbols to subcarriers, and generate OFDM symbols through inverse fast Fourier transform (IFFT) operations and cyclic prefix (CP) insertion Furthermore, when receiving data, the baseband processor 1p-20 may divide the baseband signal from the RF processor 1p-10 into OFDM symbols, recover signals mapped to subcarriers through FFT operations, and reconstruct a reception bit string through demodulation and decoding.

As described above, the baseband processor 1p-20 and the RF processor 1p-10 transmit and receive a signal. Thus, the baseband processor 1p-20 and the RF processor 1p-10 may be referred to as a transmitter, receiver, transceiver, or communicator. Furthermore, at least one of the baseband processor 1p-20 or the RF processor 1p-10 may include a plurality of communication modules to support different radio access technologies. In addition, at least one of the baseband processor 1p-20 or the RF processor 1p-10 may include different communication modules to process signals in different frequency bands. For example, the different radio access technologies may include a wireless local area network (WLAN) technology (e.g., institute of electrical and electronics engineers (IEEE) 802.11), a cellular network technology (e.g., LTE), etc. The different frequency bands may include super-high frequency (SHF) bands (e.g., 2.NRHz, NRhz) and millimeter (mm)-wave bands (e.g., 60 GHz). The UE may transmit and receive a signal to and from a base station via the baseband processor 1p-20 and the RF processor 1p-10, and the signal may include control information and data.

The storage 1p-30 stores basic programs, application programs, and data such as configuration information for operations of the UE. The storage 1p-30 provides stored data at the request of the controller 1p-40. The storage 1p-30 may be composed of storage media, such as read-only memory (ROM), random access memory (RAM), hard discs, compact disc (CD)-ROM, and digital versatile discs (DVDs), or a combination thereof. Furthermore, the storage 1p-30 may include a plurality of memories.

The controller 1p-40 may control all operations of the UE. For example, the controller 1p-40 may transmit and receive a signal via the baseband processor 1p-20 and the RF processor 1p-10. The controller 1p-40 also writes and reads data to and from the storage 1p-30. To do so, the controller 1p-40 may include at least one processor. For example, the controller 1p-40 may include a communication processor (CP) to control communication and an application processor (AP) to control higher layers such as application programs. Furthermore, the controller 1p-40 may control the UE to perform a method of receiving a downlink signal by using the above-described multiple beams. Furthermore, at least one component in the UE may be implemented as a single chip.

FIG. 1Q illustrates a configuration of a base station according to an embodiment of the disclosure.

Referring to FIG. 1Q, the base station may include an RF processor 1q-10, a baseband processor 1q-20, a backhaul communicator 1q-30, a storage 1q-40, and a controller 1q-50. The controller 1q-50 may include a multi-connectivity processor 1q-52. The internal structure of the base station is not limited to the above example, and the base station may include fewer or more components that those shown in FIG. 1Q.

The RF processor 1q-10 performs a function for transmitting and receiving a signal via a radio channel, such as signal conversion between bands and amplification. For example, the RF processor 1q-10 may upconvert a baseband signal from the baseband processor 1q-20 into an RF signal and transmit the RF signal via an antenna, and downconvert an RF signal received via the antenna into a baseband signal. For example, the RF processor 1q-10 may include a transmit filter, a receive filter, an amplifier, a mixer, an oscillator, a DAC, an ADC, etc. Although only one antenna is shown in FIG. 1Q, the base station may have a plurality of antennas. The RF processor 1q-10 may include a plurality of RF chains. Furthermore, the RF processor 1q-10 may perform beamforming. For beamforming, the RF processor 1q-10 may adjust a phase and magnitude of each of the signals transmitted and received through a plurality of antennas or antenna elements. Furthermore, the RF processor 1q-10 may perform a MIMO operation by transmitting one or more layers.

The baseband processor 1q-20 may perform a function for conversion between a baseband signal and a bit string according to the physical layer standard of a radio access technology. For example, when transmitting data, the baseband processor 1q-20 may generate complex symbols by encoding and modulating a transmission bit string. When receiving data, the baseband processor 1q-20 may reconstruct a reception bit string by demodulating and decoding a baseband signal from the RF processor 1q-10. For example, according to an OFDM scheme, when transmitting data, the baseband processor 1q-20 may generate complex symbols by encoding and modulating a transmission bit string, map the complex symbols to subcarriers, and generate OFDM symbols through IFFT operations and CP insertion. Furthermore, when receiving data, the baseband processor 1q-20 may divide the baseband signal from the RF processor 1q-10 into OFDM symbols, recover signals mapped to subcarriers through FFT operations, and reconstruct a reception bit string through demodulation and decoding. As described above, the baseband processor 1q-20 and the RF processor 1q-10 transmit and receive signals. Thus, the baseband processor 1q-20 and the RF processor 1q-10 may be referred to as a transmitter, receiver, transceiver, communicator, or wireless communicator. The base station may transmit and receive a signal to and from the UE via the baseband processor 1q-20 and the RF processor 1q-10, and the signal may include control information and data.

The backhaul communicator 1q-30 may provide an interface to communicate with other nodes in the network. For example, the backhaul communicator 1q-30 may convert a bit string to be transmitted from a primary BS to another node, such as a secondary BS and a CN, into a physical signal, and may convert a physical signal received from the other node into a bit string.

The storage 1q-40 may store basic programs, application programs, and data such as configuration information for operations of the base station. In particular, the storage 1q-40 may store information about bearers allocated to a connected UE, measurement results reported by the connected UE, etc. Furthermore, the storage 1q-40 may store information that is a criterion for determining whether to provide or terminate multiple connectivity to or from the UE. The storage 1q-40 provides stored data at the request of the controller 1q-50. The storage 1p-30 may be composed of storage media, such as ROM, RAM, hard discs, CD-ROM, and DVDs, or a combination thereof. Furthermore, the storage 1q-40 may include a plurality of memories.

The controller 1q-50 controls all operations of the base station. For example, the controller 1q-50 transmits and receives a signal through the baseband processor 1q-20 and the RF processor 1q-10 or through the backhaul communicator 1q-30. Furthermore, the controller 1q-50 writes and reads data to and from the storage 1q-40. To do so, the controller 1q-50 may include at least one processor. Furthermore, the controller 1q-50 may control the base station such that the UE may perform a method of receiving a downlink signal by using the above-described multiple beams. In addition, at least one component in the base station may be implemented as a single chip.

The methods according to the embodiments of the disclosure described in the appended claims or specification thereof may be implemented in hardware, software, or a combination of hardware and software.

When the methods are implemented in software, a computer-readable storage medium storing at least one program (software module) may be provided. The at least one program stored in the computer-readable storage medium is configured for execution by at least one processor within an electronic device. The at least one program includes instructions that cause the electronic device to execute the methods according to the embodiments of the disclosure described in the claims or specification thereof.

The program (software module or software) may be stored in RAM, non-volatile memory including a flash memory, ROM, electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. The storage device may access a device performing methods according to the embodiments of the disclosure through an external port. Further, a separate storage device on the communication network may also access a device performing methods according to the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience, and the disclosure is not limited to the singular or plural form. An element expressed in a plural form may be configured as a single element, or an element expressed in a singular form may be configured as a plurality of elements.

According to embodiments of the disclosure, a method and apparatus for effectively providing a service in a mobile communication system are provided. Furthermore, according to embodiments of the disclosure, a method and apparatus for transmitting and receiving signals by using multiple beams are provided.

The embodiments of the disclosure disclosed in the present specification and the accompanying drawings have been provided only as specific examples in order to assist in understanding the disclosure and do not limit the scope of the disclosure. It is obvious to those of ordinary skill in the art that other modifications may be made based on the technical spirit of the disclosure without departing from the scope of the disclosure. The embodiments of the disclosure may be combined with each other for operation when necessary. For example, an embodiment of the disclosure may be combined with parts of other embodiments of the disclosure to operate a BS and a UE. Embodiments of the disclosure may be applicable to other communication systems, and other modifications based on the technical spirit of the embodiments of the disclosure may be implementable.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station (BS), physical downlink shared channel (PDSCH) configuration information including a list of transmission configuration indicator (TCI) states;
   receiving, from the BS, a PDSCH media access control element (MAC CE) including information indicating an activation of at least one TCI state in the list of TCI states, the PDSCH MAC CE being associated with a logical channel identifier (LCID) value;
   identifying that the PDSCH MAC CE is a MAC CE capable of indicating two or more TCI states for one TCI codepoint based on the LCID value associated with the PDSCH MAC CE;
   receiving, from the BS, downlink control information (DCI) including information indicating a TCI codepoint; and
   receiving, from the BS, data via a PDSCH based on the information indicating the activation of the at least one TCI state and the information indicating the TCI codepoint.

2. The method of claim 1, wherein the information indicating activation of the at least one TCI state comprises:
   an identifier of a first TCI state mapped to a first TCI codepoint; and
   an indicator indicating whether an identifier of a second TCI state mapped to the first TCI codepoint is present.

3. The method of claim 2, wherein the identifier of the second TCI state is included in the information indicating activation of the at least one TCI state in case that a value of the indicator is 1,
   wherein the identifier of the second TCI state is not included in the information indicating activation of the at least one TCI state in case that a value of the indicator is 0, and
   wherein by the information indicating activation of the at least one TCI state, for at least one TCI codepoint, two TCI states are indicated.

4. The method of claim 3, wherein receiving, from the BS, the data via the PDSCH comprises receiving a first PDSCH transmission to which the first TCI state is applied and a second PDSCH transmission to which the second TCI state is applied, and
   wherein the first PDSCH transmission and the second PDSCH transmission are associated with a same transport block (TB).

5. The method of claim 1, wherein:
   the information indicating the activation of the at least one TCI state comprises TCI state identifiers for up to eight TCI codepoints, and
   one or two TCI states are mapped to each of the TCI codepoints.

6. A method performed by a base station (BS) in a wireless communication system, the method comprising:
   transmitting, to a user equipment (UE), physical downlink shared channel (PDSCH) configuration information including a list of transmission configuration indicator (TCI) states;
   transmitting, to the UE, a PDSCH media access control element (MAC CE) including information indicating an activation of at least one TCI state in the list of TCI states, the PDSCH MAC CE being capable of indicating two or more TCI states for one TCI codepoint, the PDSCH MAC CE being associated with a logical channel identifier (LCID) value;
   transmitting, to the UE, downlink control information (DCI) including information indicating a TCI codepoint; and
   transmitting, to the UE, data via a PDSCH based on the information indicating the activation of the at least one TCI state and the information indicating the TCI codepoint.

7. The method of claim 6, wherein the information indicating the activation of the at least one TCI state comprises:
- an identifier of a first TCI state mapped to a first TCI codepoint; and
- an indicator indicating whether an identifier of a second TCI state mapped to the first TCI codepoint is present.

8. The method of claim 7, wherein the identifier of the second TCI state is included in the information indicating activation of the at least one TCI state in case that a value of the indicator is 1,
- wherein the identifier of the second TCI state is not included in the information indicating activation of the at least one TCI state in case that a value of the indicator is 0, and
- wherein by the information indicating activation of the at least one TCI state, for at least one TCI codepoint, two TCI states are indicated.

9. The method of claim 8, wherein transmitting, to the UE, the data via the PDSCH comprises transmitting a first PDSCH transmission to which the first TCI state is applied and a second PDSCH transmission to which the second TCI state is applied, and
- wherein the first PDSCH transmission and the second PDSCH transmission are associated with a same transport block (TB).

10. The method of claim 6, wherein:
- the information indicating the activation of the at least one TCI state comprises TCI state identifiers for up to eight TCI codepoints, and
- one or two TCI states are mapped to each of the TCI codepoints.

11. A user equipment (UE) in a wireless communication system, the UE comprising:
- a transceiver; and
- a processor operably connected to the transceiver, the processor configured to:
  - receive, from a base station (BS), physical downlink shared channel (PDSCH) configuration information including a list of transmission configuration indicator (TCI) states,
  - receive, from the BS, a PDSCH media access control element (MAC CE) including information indicating activation of at least one TCI state in the list of TCI states, the PDSCH MAC CE being associated with a logical channel identifier (LCID) value,
  - identify that the PDSCH MAC CE is a MAC CE capable of indicating two or more TCI states for one TCI codepoint based on the LCID value associated with the PDSCH MAC CE,
  - receive, from the BS, downlink control information (DCI) including information indicating a TCI codepoint, and
  - receive, from the BS, data via a PDSCH based on the information indicating the activation of the at least one TCI state and the information indicating the TCI codepoint.

12. The UE of claim 11, wherein the information indicating activation of the at least one TCI state comprises:
- an identifier of a first TCI state mapped to a first TCI codepoint; and
- an indicator indicating whether an identifier of a second TCI state mapped to the first TCI codepoint is present.

13. The UE of claim 12, wherein the identifier of the second TCI state is included in the information indicating activation of the at least one TCI state in case that a value of the indicator is 1,
- wherein the identifier of the second TCI state is not included in the information indicating activation of the at least one TCI state in case that a value of the indicator is 0, and
- wherein by the information indicating activation of the at least one TCI state, for at least one TCI codepoint, two TCI states are indicated.

14. The UE of claim 13, wherein the processor is further configured to receive, from the BS, a first PDSCH transmission to which the first TCI state is applied and a second PDSCH transmission to which the second TCI state is applied, and
- wherein the first PDSCH transmission and the second PDSCH transmission are associated with a same transport block (TB).

15. A base station (BS) in a wireless communication system, the BS comprising:
- a transceiver; and
- a processor operably connected to the transceiver, the processor configured to:
  - transmit, to a user equipment (UE), physical downlink shared channel (PDSCH) configuration information including a list of transmission configuration indicator (TCI) states,
  - transmit, to the UE, a PDSCH media access control element (MAC CE) including information indicating an activation of at least one TCI state in the list of TCI states, the PDSCH MAC CE being capable of indicating two or more TCI states for one TCI codepoint, the PDSCH MAC CE being associated with a logical channel identifier (LCID) value,
  - transmit, to the UE, downlink control information (DCI) including information indicating a TCI codepoint, and
  - transmit, to the UE, data via a PDSCH based on the information indicating the activation of the at least one TCI state and the information indicating the TCI codepoint.

16. The BS of claim 15, wherein the information indicating the activation of the at least one TCI state comprises:
- an identifier of a first TCI state mapped to a first TCI codepoint; and
- an indicator indicating whether an identifier of a second TCI state mapped to the first TCI codepoint is present.

* * * * *